(12) United States Patent
Kimrey, Jr. et al.

(10) Patent No.: US 11,032,879 B2
(45) Date of Patent: Jun. 8, 2021

(54) ENERGY CONTROL ELEMENTS FOR IMPROVED MICROWAVE HEATING OF PACKAGED ARTICLES

(71) Applicant: 915 Labs, Inc., Denver, CO (US)

(72) Inventors: Harold Dail Kimrey, Jr., Knoxville, TN (US); Lora Nicolette Spizzirri, Chicago, IL (US); Li Zhang, Alpharetta, GA (US); David Behringer, Denver, CO (US); Matthew Raider, Denver, CO (US)

(73) Assignee: 915 LABS, INC., Denver, CO (US)

( * ) Notice: Subject to any disclaimer, the term of this patent is extended or adjusted under 35 U.S.C. 154(b) by 510 days.

(21) Appl. No.: 15/921,327

(22) Filed: Mar. 14, 2018

(65) Prior Publication Data

US 2018/0270919 A1 Sep. 20, 2018

Related U.S. Application Data

(60) Provisional application No. 62/471,654, filed on Mar. 15, 2017.

(51) Int. Cl.
*H05B 6/78* (2006.01)
*H05B 6/70* (2006.01)
(Continued)

(52) U.S. Cl.
CPC ......... *H05B 6/782* (2013.01); *B65D 81/3453* (2013.01); *B65D 81/3461* (2013.01);
(Continued)

(58) Field of Classification Search
CPC .... H05B 6/782; H05B 6/6408; H05B 6/6494; H05B 6/687; H05B 6/704; H05B 6/802; H05B 2206/045
(Continued)

(56) References Cited

U.S. PATENT DOCUMENTS 2,485,659 A   10/1949  Robertson
2,500,752 A    3/1950  Hanson et al.
(Continued)

FOREIGN PATENT DOCUMENTS

CA   2961408      3/2016
CN   1729047 A    2/2006
(Continued)

OTHER PUBLICATIONS

Craig B. Koskiniemi et al., Improvement of heating uniformity in packaged acidified vegetables pasteurized with a 915 MHz continuous microwave system, Journal of Food Engineering (105), Feb. 10, 2011, pp. 149-160, www.elsevier.com/locate/jfoodeng, Department of Food, Bioprocessing and Nutrition Sciences, North Carolina State University, Raleigh, NC, USA.
(Continued)

*Primary Examiner* — Phuong T Nguyen
(74) *Attorney, Agent, or Firm* — Polsinelli PC

(57) ABSTRACT

Processes and systems that enhance the heating of packaged foodstuffs and other items in various microwave heating systems are described herein. The foodstuffs may be contained in a package including one or more energy control elements that interact with microwave energy in order to alter the effect that microwave energy has on the foodstuff. These energy control elements can enhance or inhibit microwave energy and a single package may include one or more energy control elements. In some cases, the energy control element may respond differently to different types of microwave energy. As a result, some packages described herein may exhibit different absorption or reflectance characteristics when exposed to microwave energy while being pasteurized or sterilized in a larger-scale microwave heating system than when the package is reheated in an at-home microwave oven prior to consumption or use.

18 Claims, 11 Drawing Sheets

(51) Int. Cl.
  *H05B 6/68* (2006.01)
  *B65D 81/34* (2006.01)
  *H05B 6/80* (2006.01)
  *H05B 6/64* (2006.01)

(52) U.S. Cl.
  CPC ......... *H05B 6/6408* (2013.01); *H05B 6/6494* (2013.01); *H05B 6/687* (2013.01); *H05B 6/704* (2013.01); *H05B 6/802* (2013.01); *B65D 2581/344* (2013.01); *B65D 2581/3489* (2013.01); *B65D 2581/3491* (2013.01); *B65D 2581/3493* (2013.01); *B65D 2581/3497* (2013.01); *B65D 2581/3498* (2013.01); *H05B 2206/045* (2013.01); *Y02B 40/00* (2013.01)

(58) Field of Classification Search
  USPC ................ 219/679, 690, 700, 702, 728, 757
  See application file for complete search history.

(56) References Cited

U.S. PATENT DOCUMENTS

| | | |
|---|---|---|
| 2,743,440 A | 4/1956 | Riblet |
| 2,769,145 A | 10/1956 | Zaleski et al. |
| 2,946,056 A | 7/1960 | Shanks |
| 3,092,503 A | 6/1963 | Gray |
| 3,261,140 A | 7/1966 | Long et al. |
| 3,365,562 A | 1/1968 | Jeppson |
| 3,398,251 A | 8/1968 | Jeppson et al. |
| 3,402,277 A | 9/1968 | Muller |
| 3,437,495 A | 4/1969 | Jeppson |
| 3,495,062 A | 2/1970 | Puschner |
| 3,521,186 A | 7/1970 | Sharpe |
| 3,544,923 A | 12/1970 | Williams |
| 3,564,458 A | 2/1971 | Cumming |
| 3,597,240 A | 8/1971 | Foltz |
| 3,610,573 A | 10/1971 | Robertson |
| 3,718,082 A | 2/1973 | Lipoma |
| 3,753,651 A | 8/1973 | Boucher |
| 3,814,899 A | 6/1974 | Stenstrom |
| 3,820,549 A | 6/1974 | Flinchbaugh |
| 3,945,170 A | 3/1976 | Brown |
| 3,961,569 A | 6/1976 | Kenyon et al. |
| 4,052,036 A | 10/1977 | Schertler |
| 4,071,833 A | 1/1978 | Gould |
| 4,168,418 A | 9/1979 | Bird |
| RE30,310 E | 6/1980 | Stenstrom |
| 4,282,887 A | 8/1981 | Sterzer |
| 4,301,347 A | 11/1981 | Quine |
| 4,332,091 A | 6/1982 | Bensussan et al. |
| 4,336,434 A | 6/1982 | Miller |
| 4,393,088 A | 7/1983 | Matsusaka |
| 4,395,685 A | 7/1983 | Davies et al. |
| 4,446,349 A | 5/1984 | Smith |
| 4,464,554 A | 8/1984 | Bakanowski et al. |
| 4,518,618 A | 5/1985 | Hsia et al. |
| 4,573,660 A | 3/1986 | Husted |
| 4,608,261 A | 8/1986 | MacKenzie |
| 4,613,836 A | 9/1986 | Evans |
| 4,622,448 A | 11/1986 | Awata et al. |
| 4,624,854 A | 11/1986 | Naumann et al. |
| 4,687,895 A | 8/1987 | Chitre et al. |
| 4,779,649 A | 10/1988 | Balter |
| 4,808,782 A | 2/1989 | Nakagawa et al. |
| 4,808,783 A | 2/1989 | Stenstrom |
| 4,839,142 A | 6/1989 | Charm |
| 4,839,485 A | 6/1989 | Koch et al. |
| 4,866,233 A | 9/1989 | Fritz |
| 4,870,236 A | 9/1989 | Berggren |
| 4,874,917 A | 10/1989 | Weimer |
| 4,880,648 A | 11/1989 | Stamer |
| 4,922,215 A | 5/1990 | Bergero et al. |
| 4,999,471 A | 3/1991 | Guameri et al. |
| 5,049,816 A | 9/1991 | Moslehi |
| 5,066,503 A | 11/1991 | Ruozi |
| 5,074,200 A | 12/1991 | Ruozi |
| 5,080,164 A | 1/1992 | Hermans |
| 5,098,665 A | 3/1992 | Katschnig et al. |
| 5,101,084 A | 3/1992 | Atwell et al. |
| 5,108,701 A | 4/1992 | Zakaria et al. |
| 5,160,819 A | 11/1992 | Ball et al. |
| 5,185,506 A | 2/1993 | Walters |
| 5,228,947 A | 7/1993 | Churland |
| 5,326,530 A | 7/1994 | Bridges |
| 5,379,983 A | 1/1995 | Geiser |
| 5,396,919 A | 3/1995 | Wilson |
| 5,410,283 A | 7/1995 | Gooray et al. |
| 5,436,432 A | 7/1995 | Cyr |
| 5,546,849 A | 8/1996 | Shefet |
| 5,619,908 A | 4/1997 | Catelli et al. |
| 5,750,966 A | 5/1998 | Ruozi |
| 5,903,241 A | 5/1999 | Bhattacharyya |
| 5,910,268 A | 6/1999 | Keefer |
| 6,034,361 A | 3/2000 | Hudak |
| 6,074,202 A | 6/2000 | Yagi et al. |
| 6,153,868 A | 11/2000 | Marzat |
| 6,403,939 B1 | 6/2002 | Fagrell |
| 6,612,546 B2 | 9/2003 | Young et al. |
| 6,707,347 B2 | 3/2004 | Huang et al. |
| 6,784,405 B2 | 8/2004 | Flugstad et al. |
| 6,831,259 B2 | 12/2004 | Muegge |
| 6,844,534 B2 | 1/2005 | Haamer |
| 6,863,773 B1 | 3/2005 | Emmerich et al. |
| 7,110,313 B2 | 9/2006 | Huang |
| 7,119,313 B2 | 10/2006 | Tang et al. |
| 7,154,103 B2 | 12/2006 | Koenck et al. |
| 7,208,710 B2 | 4/2007 | Gregoire et al. |
| 7,230,218 B2 | 6/2007 | Roussy |
| 7,518,092 B2 | 4/2009 | Purta et al. |
| 7,863,997 B1 | 1/2011 | Alton et al. |
| 7,975,983 B2 | 7/2011 | Comeaux et al. |
| 7,993,603 B2 | 8/2011 | Amedeo et al. |
| 7,996,306 B2 | 8/2011 | Gonen et al. |
| 8,087,407 B2 | 1/2012 | Wiker et al. |
| 8,426,784 B2 | 4/2013 | Drozd |
| 8,657,256 B2 | 2/2014 | Geiser |
| 9,049,751 B1 | 6/2015 | Erle |
| 9,642,385 B2 | 5/2017 | Tang et al. |
| 9,955,711 B2 | 5/2018 | Newman |
| 2003/0034345 A1 | 2/2003 | Conway et al. |
| 2004/0027303 A1 | 2/2004 | Drozd |
| 2005/0123435 A1 | 6/2005 | Cutler et al. |
| 2005/0199618 A1 | 9/2005 | Cook et al. |
| 2006/0231550 A1 | 6/2006 | Wendel et al. |
| 2006/0151533 A1 | 7/2006 | Simunovic et al. |
| 2007/0215611 A1 | 9/2007 | O'Hagan et al. |
| 2007/0235448 A1 | 10/2007 | Lihl et al. |
| 2008/0264934 A1 | 10/2008 | Moreira et al. |
| 2008/0299276 A1 | 12/2008 | Eubanks et al. |
| 2009/0092708 A1 | 4/2009 | Alvarado et al. |
| 2009/0208614 A1 | 8/2009 | Sharma et al. |
| 2009/0236334 A1 | 9/2009 | Ben-Shmuel et al. |
| 2009/0283517 A1 | 11/2009 | Mackay et al. |
| 2009/0321428 A1 | 12/2009 | Hyde et al. |
| 2010/0059510 A1 | 3/2010 | Ristola et al. |
| 2010/0060391 A1 | 3/2010 | Ristola et al. |
| 2010/0072194 A1 | 3/2010 | Mackay et al. |
| 2010/0126988 A1 | 5/2010 | Mackay et al. |
| 2010/0282741 A1 | 11/2010 | Van Daele et al. |
| 2011/0233442 A1 | 9/2011 | Nygaard et al. |
| 2011/0266717 A1 | 11/2011 | Nehls et al. |
| 2011/0287151 A1 | 11/2011 | Simunovic et al. |
| 2011/0303102 A1 | 12/2011 | Amedeo et al. |
| 2012/0063752 A1 | 3/2012 | Cochran |
| 2012/0092091 A1 | 4/2012 | Kang |
| 2012/0279448 A1 | 11/2012 | Muegge et al. |
| 2013/0149075 A1 | 6/2013 | Shah et al. |
| 2013/0240516 A1 | 9/2013 | Kimrey, Jr. |
| 2013/0240517 A1 | 9/2013 | Kimrey, Jr. et al. |
| 2013/0243560 A1 | 9/2013 | Kimrey, Jr. et al. |
| 2014/0083820 A1 | 3/2014 | Mackay |
| 2016/0119984 A1* | 4/2016 | Kimrey, Jr. ............ H05B 6/701 219/690 |
| 2016/0183333 A1 | 6/2016 | Mohammed et al. |

(56) References Cited

U.S. PATENT DOCUMENTS

| | | |
|---|---|---|
| 2016/0309549 A1 | 10/2016 | Kimrey, Jr. et al. |
| 2017/0027196 A1 | 2/2017 | Resurreccion et al. |
| 2017/0043936 A1 | 2/2017 | Resurreccion, Jr. |
| 2017/0099704 A1 | 4/2017 | Kimrey, Jr. et al. |
| 2017/0142785 A1 | 5/2017 | Chang et al. |
| 2017/0245528 A1 | 8/2017 | Hirschey et al. |
| 2018/0014559 A1 | 1/2018 | Tang et al. |
| 2018/0057244 A1 | 3/2018 | Boek |
| 2018/0111359 A1 | 4/2018 | Komro et al. |

FOREIGN PATENT DOCUMENTS

| | | |
|---|---|---|
| CN | 1849846 | 10/2006 |
| CN | 101970197 | 2/2011 |
| CN | 106465491 | 2/2017 |
| CN | 106472947 A | 3/2017 |
| CN | 206077729 U | 4/2017 |
| CN | 206077730 U | 4/2017 |
| CN | 106658803 | 5/2017 |
| CN | 106793812 | 5/2017 |
| CN | 206403121 U | 8/2017 |
| CN | 107252030 | 10/2017 |
| CN | 206576184 U | 10/2017 |
| CN | 107535796 A | 1/2018 |
| CN | 206994307 | 2/2018 |
| CN | 207305995 U | 5/2018 |
| EP | 2335483 | 6/2011 |
| EP | 3169141 A1 | 5/2017 |
| EP | 3277496 A1 | 2/2018 |
| EP | 2366268 B1 | 5/2018 |
| FR | 1473832 | 9/1964 |
| FR | 2645391 | 4/1989 |
| GB | 2067059 | 7/1981 |
| GB | 2541373 A | 2/2017 |
| JP | 2005-295848 A | 10/2005 |
| JP | 2008-253202 A | 10/2008 |
| JP | 2010-139217 A | 6/2010 |
| JP | 2010-166863 A | 8/2010 |
| JP | 2011-21210 A | 2/2011 |
| JP | 3211163 U | 6/2017 |
| JP | 2017521111 | 8/2017 |
| JP | 2017532029 | 11/2017 |
| KR | 10-0242633 B1 | 2/2000 |
| KR | 10-2008-0087821 | 10/2008 |
| KR | 1020170054433 A | 5/2017 |
| KR | 1020180016081 | 2/2018 |
| KR | 101849847 B | 4/2018 |
| WO | 97/26777 | 7/1997 |
| WO | 2004/036991 | 5/2004 |
| WO | 2004/056468 A1 | 7/2004 |
| WO | 2005/023013 | 3/2005 |
| WO | 2006012506 A1 | 2/2006 |
| WO | 2007108674 | 9/2007 |
| WO | 2017055501 A1 | 4/2017 |
| WO | 2018017548 A1 | 1/2018 |
| WO | 2018026168 A1 | 2/2018 |
| WO | 2018039112 A1 | 3/2018 |
| WO | 2018063468 A1 | 4/2018 |
| WO | 2018063469 A1 | 4/2018 |
| WO | 2018097355 A1 | 5/2018 |

OTHER PUBLICATIONS

FDA Proposes to Allow the Use of Alternative Temperature-Indicating Devices for Processing Low-Acid Canned Foods, FDS News Release, http://www.fda.gov/NewsEvents/Newsroom/PressAnnouncements/2007/ucm108867.htm, Mar. 13, 2007, 2 pages.

* cited by examiner

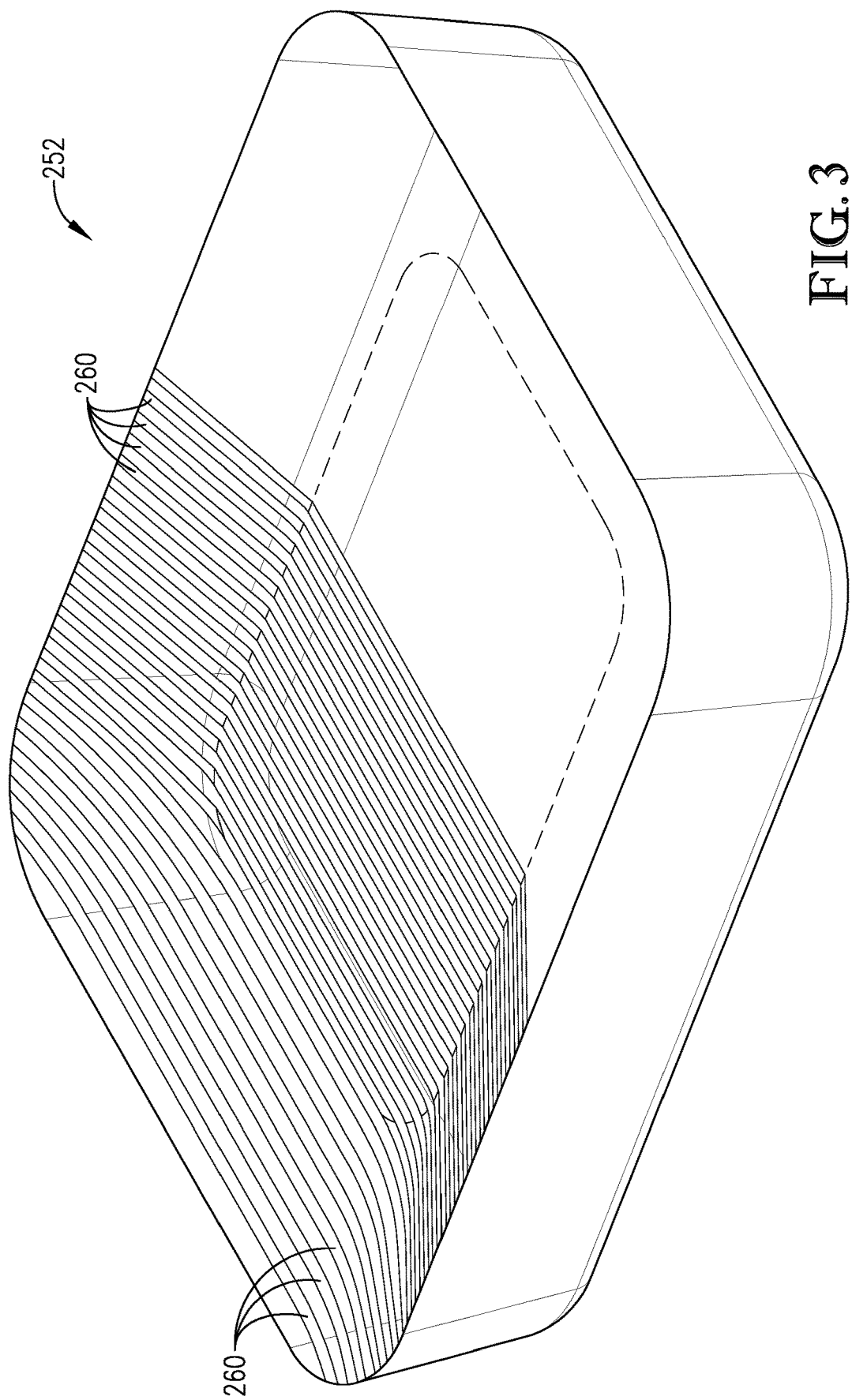

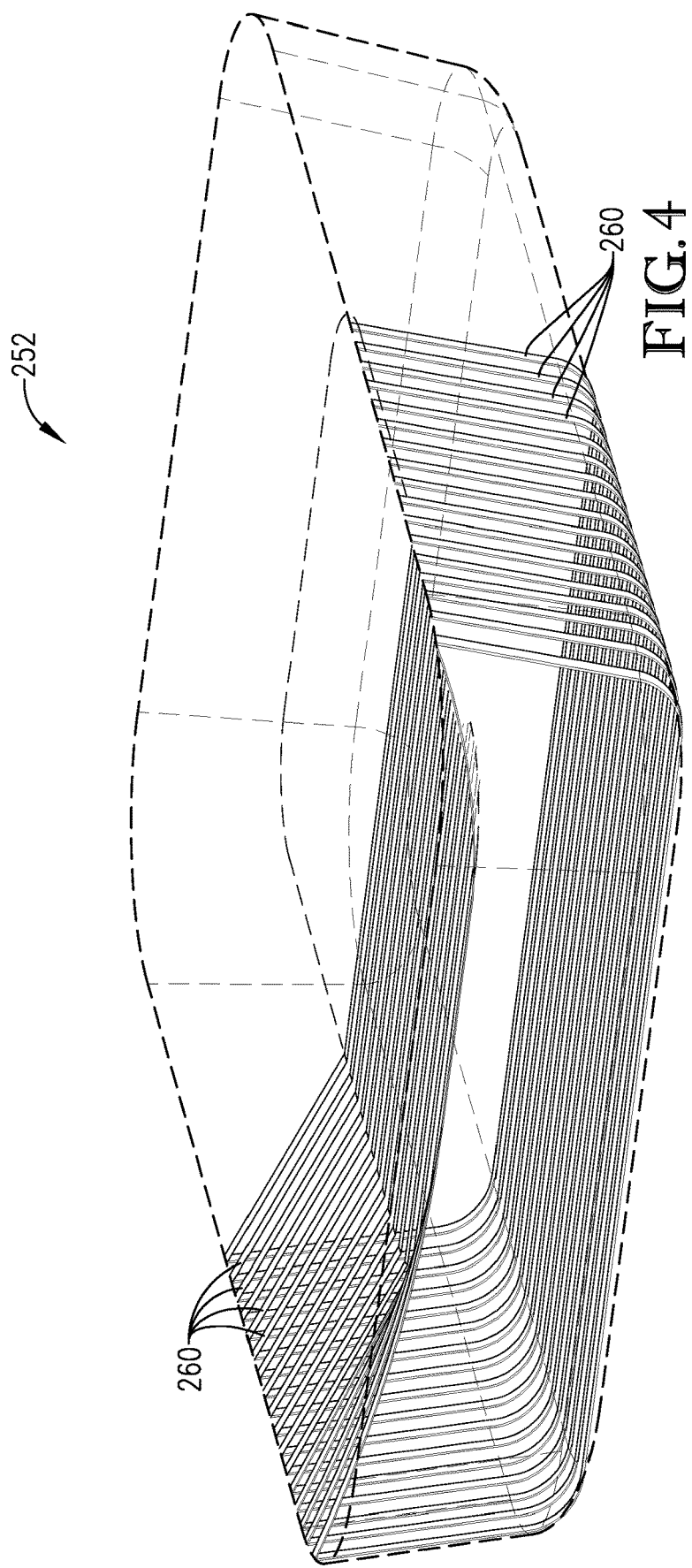

ENERGY CONTROL ELEMENTS FOR IMPROVED MICROWAVE HEATING OF PACKAGED ARTICLES

CROSS-REFERENCE TO RELATED APPLICATIONS

This application claims priority to U.S. Provisional Patent Application No. 62/471,654, filed on Mar. 15, 2017, the entire disclosure of which is incorporated by reference herein.

FIELD OF THE INVENTION

The present invention relates processes and systems for heating articles using microwave energy. In particular, the present invention relates to methods and systems for providing enhanced heating to packaged materials that are pasteurized or sterilized in large-scale microwave heating systems, including those which are then reheated in a consumer microwave oven prior to consumption or use.

BACKGROUND

Commercially-available packaged food items are often pasteurized or sterilized prior to being purchased by a consumer. Many of these items are also designed to be reheated by the consumer in an at-home microwave oven prior to consumption. However, because of the differences in conditions during the pasteurization or sterilization of the packaged foodstuff and its reheating, the foodstuff may develop "hot" and "cold" spots that are difficult or impossible to control simply with adjustments to the process and/or equipment. In some cases, for example, the hot and cold spots may occur because of spatial constraints (e.g., the orientation of the package within the heating chamber), or because of a physical property of the foodstuff (e.g., its dielectric constant).

Thus, a need exists for a package suitable for use in both commercial-scale pasteurization or sterilization and at-home consumer microwave ovens that facilitates uniform heating of packaged foodstuffs and other packaged items under a variety of conditions.

SUMMARY

One embodiment of the present invention concerns a process for heating a plurality of articles in a microwave heating system, the process comprising: (a) loading a group of the articles into a carrier, wherein each of the articles includes a package at least partially filled with at least one foodstuff, wherein at least a portion of the foodstuff in one or more of the packages is positioned near at least one energy control element; (b) passing the loaded carrier through a microwave heating chamber in a direction of travel along a first convey line; (c) generating microwave energy; (d) during at least a portion of the passing, discharging at least a portion of the microwave energy into the microwave heating chamber; and (e) heating the articles using at least a portion of the microwave energy discharged into the microwave heating chamber. During the heating, the portion of the foodstuff positioned near the energy control element is heated to a substantially different temperature and/or at a substantially different heating rate than the portion of the foodstuff would have been heated to or at if the energy control element was not present.

Another embodiment of the present invention concerns a process for heating a plurality of articles in a microwave heating system, the process comprising: (a) loading a carrier with a plurality of the articles, wherein each article comprises a package at least partially filled with at least one item to be heated; (b) passing the loaded carrier through a microwave heating chamber in a direction of travel along a convey line; (c) during at least a portion of said passing, directing microwave energy into the microwave heating chamber via one or more microwave launchers; and (d) during at least a portion of the directing, heating the articles with at least a portion of the microwave energy in order to increase the temperature of the coldest portion of each item to a target temperature. At least a portion of the packages include at least one microwave inhibiting element for inhibiting or preventing microwave energy from reaching at least a portion of the item during the heating.

Yet another embodiment of the present invention concerns an article suitable for being pasteurized or sterilized in a microwave heating system, the article comprising at least one foodstuff; and a package comprising at least one compartment for holding the foodstuff. The package further comprises at least one energy control element for altering the interaction between at least a portion of the foodstuff and microwave energy when the package is exposed to microwave energy. The energy control element is configured to exhibit at least one of the following characteristics (i) and (ii)-(i) absorb polarized and non-polarized or randomly polarized microwave energy differently; and (ii) reflect polarized and non-polarized or randomly polarized microwave energy differently.

Still another embodiment of the present invention concerns a process for heating a packaged foodstuff using microwave energy, the process comprising: (a) at least partially filling a package with at least one foodstuff to form a packaged foodstuff, wherein the package includes at least one energy control element; (b) heating the packaged foodstuff using a first type of microwave energy to thereby sterilize or pasteurize the foodstuff, wherein the heating is performed in a commercial-scale microwave heating system and includes passing a carrier loaded with the packaged foodstuff along a convey line; and (c) reheating the article with a second type of microwave energy to thereby provide a ready-to-eat foodstuff. The first and second types of microwave energy have substantially different (i) polarizations, (ii) frequencies, and/or (iii) intensities and wherein the energy control element is substantially more effective at inhibiting or enhancing one of the first and second types of microwave energy than the other.

A further embodiment of the present invention concerns a process for designing a package for the sterilization and/or pasteurization of a foodstuff, wherein the process comprises: (a) filling an initial package with a test material to provide a test article; (b) heating the test article in a first microwave heating system using polarized microwave energy; (c) during at least a portion of the heating of step (b), measuring the temperature of the test material at one or more locations within the test article; (d) determining the location of at least one hot spot or cold spot based on the temperatures measured in step (c); (e) creating a modified package, wherein the creating includes one or more of the actions (i) through (iv)-(i) adding a microwave inhibiting element near a hot spot; (ii) adding a microwave enhancing element near a cold spot; (iii) removing a microwave inhibiting element from near a cold spot; and (iv) removing a microwave enhancing element from near a hot spot; (f) filling the modified package with the test material to provide a modified test article; and (g) heating the modified test article in the microwave heating system.

BRIEF DESCRIPTION OF THE DRAWINGS

Various embodiments of the present invention are described in detail below with reference to the attached drawing Figures, wherein:

FIG. 1b is an isometric view of the pouch shown in FIG. 1a;

FIG. 2b is a top view of the tray shown in FIG. 2a;

FIG. 3 is a partial isometric view of a tray according to embodiments of the present invention including a plurality of energy control elements;

FIG. 4 is an isometric end view of the tray shown in FIG. 3, particularly illustrating the configuration of the energy control strips with the tray shown in phantom;

DETAILED DESCRIPTION

Figure 1A:
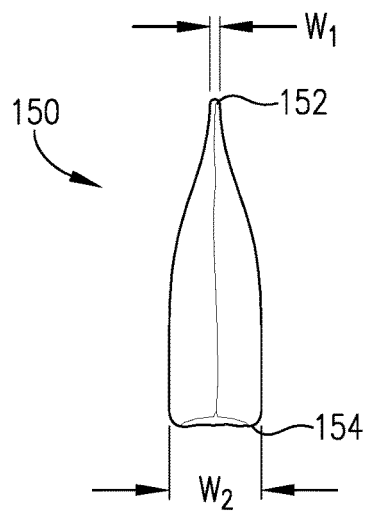
FIG. 1a is a side view of a pouch suitable for use in holding foodstuffs and other items according to embodiments of the present invention, particularly illustrating the width of the top and bottom portion of the pouch and its height.

The present invention relates to methods, systems, and packages for pasteurizing and sterilizing a foodstuff or other item in a larger-scale microwave heating system that may also be reheated in a consumer microwave oven to provide a satisfactory ready-to-eat foodstuff. Examples of microwave heating systems used for pasteurization or sterilization include any suitable liquid-filled, continuous microwave heating system including, for example, those similar to the microwave heating systems described in U.S. Patent Application Publication No. US2013/0240516, which is incorporated herein by reference in its entirety. Additionally, although described herein generally with reference to a foodstuff, it should be understood that embodiments of the present invention also relate to the pasteurization or sterilization of other types of items such as medical and dental instruments or medical and pharmaceutical fluids, which may or may not need to be reheated by the consumer prior to use.

When a packaged food item is pasteurized or sterilized in a microwave heating system and is then subsequently reheated in a consumer microwave oven, the foodstuff may be exposed to different types and/or amounts of microwave energy. Additionally, in some cases, the package may include two or more different types of food items, at least one of which may need less exposure to microwave energy than one or more of the others. This requirement for less microwave exposure may exist because, for example, the foods have different dielectric properties and/or different heating requirements (e.g., target time and/or temperature) to achieve the desired level of pasteurization or sterilization.

When a food item having lower heating requirements such as, for example, requiring less microwave exposure, is also highly susceptible to heat degradation, packaging that item with another food item having higher heating requirements may not be possible with conventional packaging. This is because the lower heating requirement food item may experience too much degradation during the sterilization process or the higher heating requirement food item. In some cases, this discrepancy may be addressed by enhancing or reducing the microwave heating of certain areas of the foodstuff during the sterilization or pasteurization process. However, this same enhancement or reduction of microwave heating may or may not be desirable during microwave reheating by the consumer.

According to some embodiments of the present invention, packages that include at least one energy control element for adjusting how microwave energy interacts with at least a portion of a packaged item are provided. As used herein, the term "energy control element" refers to any element or device that interacts with microwave energy in order to alter the effect that microwave energy has on the item being heated. Energy control elements have not been used for adjusting microwave energy in a pasteurization or sterilization system, which typically utilizes a different type of microwave energy and field than the microwave energy utilized by an at-home microwave. Thus, conventional shielding panels and other devices used exclusively in at-home microwave ovens do not perform the same way in the microwave heating systems used for pasteurization or sterilization described herein.

Energy control elements may be used to enhance or reduce heating in problematic package areas. For example, in some cases, an energy control element may be located near an easily-sterilized food item to reduce heating and prevent overheating, while, in other cases, an energy control element may be used to enhance microwave heating near a packaged food having high heating requirements. Thus, strategically-located energy control elements are useful for reducing, or even eliminating, hot and/or cold spots in a single food package. Energy control elements may also be used in multi-food packages and, in particular, in multi-food packages that include two food items having different dielectric properties and/or for packages in which one or more food items require less heating than the another. Additionally, such energy control elements may be particularly useful when the food item requiring less heating is also more susceptible to thermal degradation.

In some cases, the energy control element may comprise a selective energy control element configured to enhance or reduce microwave heating in a certain way or to a certain degree in one heating environment (e.g., a microwave pasteurization or sterilization system) and may enhance and/or reduce microwave heating in a different way or to a different degree in another heating environment (e.g., reheating in at-home microwave oven). For example, in some cases, two different food items in a single package may need to receive similar amounts of microwave heating during pasteurization or sterilization to ensure adequate microbial lethality rates, but it may be desirable for one of the items to be reheated more than the other in a consumer microwave oven (e.g., apple sauce and lasagna). In other cases, two different items in a single package may need to receive different amounts of energy during pasteurization or sterilization to prevent degradation of the food requiring less heat for sterilization. However, during reheating, it may be desirable to provide both foods with the same level of heating to ensure proper end temperature (e.g., lasagna and green beans).

The selectivity of an energy control element may depend on one or more properties of the microwave energy used to heat the item. For example, the selectivity of the energy control element may depend on the frequency, polarity, or intensity of the microwave energy being used to heat the packaged item. Selective energy control elements may be substantially more effective at inhibiting or enhancing one type of microwave energy than another and, as a result, may perform differently when exposed to each type For example, a selective energy control element may be substantially more effective at inhibiting or enhancing a first type of microwave energy that has a different frequency than another type of microwave energy. For example, a selective energy control element may be substantially more effective at inhibiting or enhancing microwave energy having a frequency of not more than 1200 MHz than microwave energy having a frequency of at least 2200 MHz. Alternatively, a selective energy control element may be substantially more effective at inhibiting or enhancing microwave energy having a frequency of at least 2200 MHz than microwave energy having a frequency of not more than 1200 MHz. In some cases, a selective energy control element may be configured to inhibit or enhance at least about 1, at least about 2, at least about 5, at least about 10, at least about 15, at least about 20, at least about 25, at least about 30, at least about 35, at least about 40, at least about 45, at least about 50, at least about 55, or at least about 60 percent more of microwave energy of one frequency than another.

Examples of different frequencies of microwave energy include microwave energy having a frequency of at least about 700 MHz, at least about 750 MHz, at least about 800 MHz, at least about 850 MHz, or at least about 900 MHz and/or not more than about 1200 MHz, not more than about 1150 MHz, not more than about 1100 MHz, not more than about 1050 MHz, not more than about 1000 MHz, or not more than about 950 MHz and microwave energy having a frequency of at least about 2200 MHz, at least about 2250 MHz, at least about 2300 MHz, at least about 2350 MHz, or at least about 2400 MHz and/or not more than about 2600 MHz, not more than about 2550 MHz, not more than about 2500 MHz, or not more than about 2475 MHz. Typically, microwave pasteurization and sterilization systems may employ microwave energy having a frequency of about 915 MHz (e.g., not 2450 MHz), while at-home (consumer) microwave ovens usually utilize microwave energy having a frequency of about 2450 MHz (e.g., not 915 MHz).

In some cases, a selective energy control element may be substantially more effective at inhibiting or enhancing a first type of microwave energy that has a different polarization than another type of microwave energy. For example, a selective energy control element may be substantially more effective at inhibiting or enhancing polarized microwave energy than non-polarized or randomly polarized microwave energy. Alternatively, a selective energy control element may be substantially more effective at inhibiting or enhancing non-polarized or randomly polarized microwave energy than polarized microwave energy. Typically, microwave pasteurization and sterilization systems employ polarized microwave energy, while at-home ovens utilize non-polarized or randomly polarized microwave energy. In some cases, a selective energy control element may be configured to inhibit or enhance at least about 10, at least about 15, at least about 20, at least about 25, at least about 30, at least about 35, at least about 40, at least about 45, at least about 50, at least about 55, or at least about 60 percent more of one of polarized and non-polarized or randomly polarized microwave energy than the other.

The selective energy control element may be substantially more effective at inhibiting or enhancing microwave energy with a substantially higher intensity, or it may be more effective at inhibiting or enhancing microwave energy at a lower intensity. Additionally, in some cases, the selective energy control element may inhibit or enhance one type of microwave energy while being substantially transparent to another. As used herein, the term "transparent" as it refers to microwave energy means that the material or element permits at least 97 percent of the incident microwave energy to pass therethrough without inhibiting or enhancing the interaction between the microwave energy and the foodstuff or other item. In some cases, a transparent material or element can permit at least about 98, at least about 98.5, at least about 99, or at least about 99.5 percent of the incident microwave energy to pass therethrough without inhibiting or enhancing the interaction between the microwave energy and the foodstuff or other item. When an energy control element is transparent to a type of microwave energy, it performs the same as if such an energy control element were absent.

It has been found that selective use of one or more energy control elements positioned near a foodstuff may be used to control the heating rate at which and/or temperature to which the foodstuff is being heated. As a result, the presence of hot and cold spots can be adjusted and easily-heated or easily-pasteurized or sterilized foodstuffs may be contained in a single package with foodstuffs that are not as easily reheated or pasteurized or sterilized. For example, in some cases, positioning an energy control element near a foodstuff or other item being heated, can cause the foodstuff or other item being heated to have a substantially different heating rate and/or a substantially different temperature than the foodstuff or other item would have been heated to or at if the energy control element was not present, under identical conditions. As used herein, the term "different" refers to values that are higher or lower than a given value. Thus, a "different" temperature may be higher or lower than a given temperature.

In some cases, the foodstuff or other item positioned near an energy control element may have heating rate that is at least about 1, at least about 2, at least about 5, at least about 10, at least about 12, at least about 15, at least about 18, at least about 20, at least about 22, at least about 25, at least about 28, or at least about 30° C./min different than the heating rate of the item if the energy control element was not present. Alternatively, or in addition, the foodstuff near the energy control element can have a heating rate that is not more than about 500, not more than about 400, not more than about 200, not more than about 100, not more than about 50, not more than about 25, or not more than about 10° C./min different than the heating rate if the energy control element was not present. In some cases, the heating rate of the foodstuff near the energy control element can be at least about 2, at least about 5, at least about 10, at least about 15, at least about 20, at least about 25, at least about 30, at least about 35, at least about 40, at least about 45, at least about 50, at least about 55, or at least about 60 percent different (i.e., higher or lower) than the heating rate of the foodstuff if the energy control element was not present.

In some cases, the foodstuff or other item positioned near the energy control element may have a different temperature than if the energy control element was not present. For example, the difference in temperature may be at least about 1, at least about 2, at least about 5, at least about 8, at least about 10, at least about 12, or at least about 15° C. and/or it can be not more than about 40, not more than about 35, not more than about 30, not more than about 25, not more than about 22, not more than about 20, not more than about 18, not more than about 15, not more than about 12, or not more than about 10° C. In some cases, the temperature of the foodstuff near the energy control element can be at least about 5, at least about 10, at least about 15, at least about 20, at least about 25, at least about 30, at least about 35, at least about 40, at least about 45, at least about 50, at least about 55, or at least about 60 percent different (i.e., higher or lower) than if the energy control element was not present.

Different types of energy control elements may be used, depending on whether the microwave heating is to be enhanced or reduced. When the energy control element is configured to enhance microwave heating, it is referred to as an "microwave enhancing element." A susceptor is one type of microwave enhancing element. The microwave enhancing element may be configured to absorb at least about 5, at least about 10, at least about 15, at least about 20, at least about 25, or at least about 30 percent of the incident microwave energy that contacts it. As used herein, the term "incident microwave energy" refers to the microwave energy incident on the particular energy control element and is not necessarily equal to the total amount of microwave energy introduced into the heating chamber. Microwave enhancing elements absorb microwave energy and increase the temperature and/or heating rate of the materials positioned near the element.

In some cases, the microwave enhancing element may be configured to absorb at least about 5, at least about 10, at least about 15, at least about 20, at least about 25, at least about 30, at least about 35, at least about 40, at least about 45, at least about 50, at least about 55, at least about 60, at least about 65, at least about 70, at least about 75, at least about 80, at least about 85, at least about 90, at least about 95 percent of the total amount of incident microwave energy. Alternatively, or in addition, it may absorb not more than about 95, not more than about 90, not more than about 85, not more than about 80, not more than about 75, not more than about 70, not more than about 65, not more than about 60, not more than about 55, not more than about 50, not more than about 45, not more than about 40, not more than about 35, not more than about 30, not more than about 25, not more than about 20, not more than about 15, not more than about 10, or not more than about 5 percent of the total amount of incident microwave energy.

The foodstuff or other item positioned near a microwave enhancing element may be heated to a higher temperature and/or at a faster heating rate than the foodstuff or other item would be heated to or at if the microwave enhancing element was not present. For example, the portion of the foodstuff positioned near the microwave enhancing element may achieve a temperature of at least about 65, at least about 70, at least about 75, at least about 80, at least about 85, at least about 90, at least about 95, at least about 100, at least about 105, at least about 110, at least about 115, at least about 117, at least about 120, or at least about 121, at least about 125° C., whereas the food may only have been heated to a temperature of not more than about 120, not more than about 115, not more than about 110, not more than about 105, not more than about 100, not more than about 95, not more than about 90, not more than about 85, not more than about 80, not more than about 75, not more than about 70, not more than about 65, or not more than about 60° C. in the absence of the microwave enhancing element. When heated to a higher temperature, the foodstuff positioned near the microwave enhancing element may also be heated at a faster heating rate than if the susceptor were absent, or the heating rate may be slower or the same.

Additionally, or in the alternative, when a microwave enhancing element is used, the portion of the foodstuff or other article positioned near the microwave enhancing element may be heated at a faster heating rate than if the microwave enhancing element were absent. For example, when positioned near a microwave enhancing element, the foodstuff may have a heating rate of at least about 10, at least about 15, at least about 20, at least about 25, at least about 30, at least about 35, at least about 40, at least about 45, at least about 50, at least about 55, at least about 60, at least about 65, at least about 70, or at least about 75° C./min, while the foodstuff may have a heating rate of not more than about 50, not more than about 45, not more than about 40, not more than about 35, not more than about 30, or not more than about 25° C./min, if the microwave enhancing element were absent. When heated at a faster rate, the foodstuff positioned near the microwave enhancing element may achieve a temperature higher than, lower than, or similar to the foodstuff if the microwave enhancing element were absent.

When the energy control element is configured to inhibit microwave energy, it is referred to as an "microwave inhibiting element." Some microwave inhibiting elements are reflectors. In some embodiments, a microwave inhibiting element may be configured to reflect at least about 5, at least about 10, at least about 15, at least about 20, at least about 25, or at least about 30 percent of the incident microwave energy that contacts it. Microwave inhibiting elements reduce or, in some cases, nearly eliminate, microwave energy contacting some portion of the foodstuff or other item. As a result, the foodstuff may be heated to a lower temperature and/or at a lower heating rate than if the microwave inhibiting element were absent. In some cases, the microwave inhibiting element may reflect at least about 5, at least about 10, at least about 15, at least about 20, at least about 25, at least about 30, at least about 35, at least about 40, at least about 45, at least about 50, at least about 55, at least about 60, at least about 65, at least about 70, at least about 75, at least about 80, at least about 85, at least about 90, at least about 95 percent of the total incident microwave energy. Alternatively, or in addition, it may reflect not more than about 95, not more than about 90, not more than about 85, not more than about 80, not more than about 75, not more than about 70, not more than about 65, not more than about 60, not more than about 55, not more than about 50, not more than about 45, not more than about 40, not more than about 35, not more than about 30, not more than about 25, not more than about 20, not more than about 15, not more than about 10, or not more than about 5 percent of the total amount of incident microwave energy.

When a microwave inhibiting element is used, the foodstuff positioned near the microwave inhibiting element may receive less than the total amount of microwave energy directed toward it. As a result, it may be heated to a lower temperature and/or at a slower heating rate than if the microwave inhibiting element was not present. For example, the foodstuff positioned near the microwave inhibiting element may have a heating rate of not more than about 100, not more than about 75, not more than about 50 not more than about 40, not more than about 35, not more than about 30, not more than about 25, not more than about 20, or not more than about 15° C./min, while the foodstuff may only have a heating rate of at least about 15, at least about 20, at least about 25, at least about 30, at least about 35, at least about 40, at least about 50, at least about 75, at least about 100, at least about 150, or at least about 200° C./min, if the microwave inhibiting element was not present. When the portion of the foodstuff or other item positioned near the microwave inhibiting element is heated at a slower rate, it may achieve approximately the same temperature as, or a different temperature than, the foodstuff or other item would achieve if the microwave inhibiting element were not present.

Additionally, or in the alternative, the foodstuff positioned near the microwave inhibiting element may be heated to a lower temperature than it would be heated if the microwave inhibiting element were not present. For example, the foodstuff near the microwave inhibiting element may be heated to a temperature of not more than about 125, not more than about 123, not more than about 122, not more than about 121, not more than about 120, not more than about 115, not more than about 110, not more than about 105, not more than about 100, not more than about 95, not more than about 90, not more than about 85, not more than about 80, not more than about 75, not more than about 70, or not more than about 65° C. If no microwave inhibiting element were present, the foodstuff may be heated, under identical conditions, to a temperature of at least about 65, at least about 70, at least about 75, at least about 80, at least about 85, at least about 90, at least about 95, at least about 100, at least about 105, at least about 110, at least about 120, at least about 121, at least about 122, at least about 125° C. The foodstuff may be heated at the same or a different heating rate than if the microwave inhibiting element was not present.

In some embodiments, the energy control element, whether a microwave inhibiting element, a microwave enhancing element, or both, may be incorporated into the package. When the energy control element is part of the package, it may be incorporated into the package itself, or may be temporarily positioned on or around at least a portion, or all, of the package (e.g., as a sleeve or wrap). When the energy control element is an integral part of the package in which the foodstuff or other item being heated is held, it may be present on at least a portion, or all, of the top, bottom, and/or sides of the package. In some cases, one or more of these areas of the package may simply be formed of a material that acts as an energy control element, while the remaining portions of the package are formed from another, typically microwave transparent material including, but not limited to, plastics, cellulosics, and combinations thereof.

The package itself may be of any suitable form. For example, in some cases, the packages used may include pouches. The pouches may be individual, detached pouches that are not connected to any other pouches. The pouches can be flexible, semi-flexible, or rigid. Each pouch can include one internal compartment for holding a foodstuff or other item, or it may include two or more separate compartments. One example of a pouch is shown in FIGS. 1a and 1b.

Figure 1B:
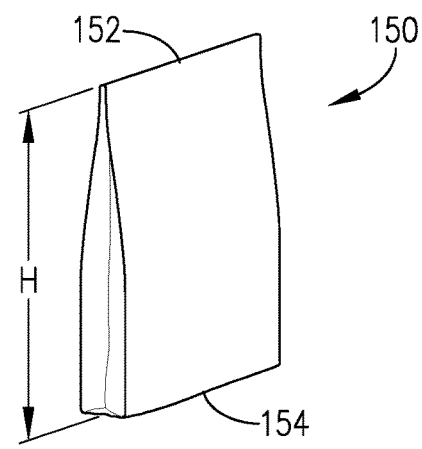
Figure 2A:
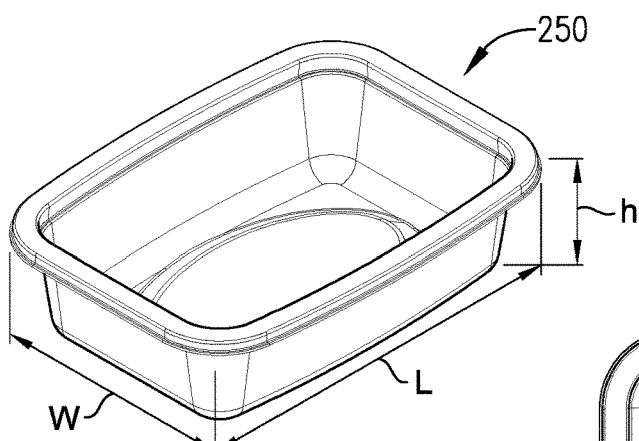
FIG. 2a is an isometric view of a tray suitable for use in holding foodstuffs and other items according to embodiments of the present invention, particularly showing the length, width, and height dimensions of the tray.
Figure 2B:
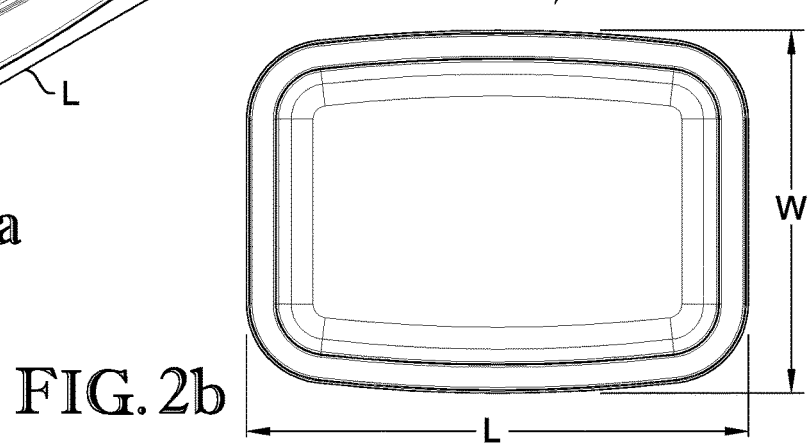
Figure 2C:
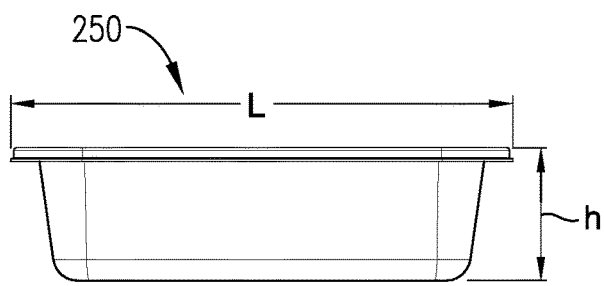
FIG. 2c is a side view of the tray shown in FIGS. 2a and 2b.
Figure 2D:
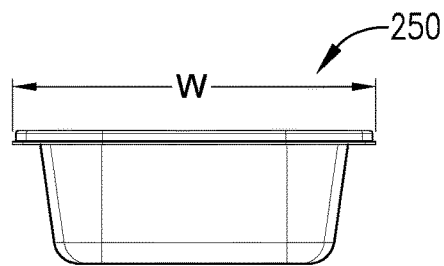
FIG. 2d is an end view of the tray shown in FIGS. 2a-2c.

As shown in FIGS. 1a and 1b, each pouch 150 has a top portion 152 and a base portion 154 that is wider than top portion 152. The base portion 154 of the pouch 150 can be at least twice, at least three times, or at least four times wider than the top portion 152. Alternatively, the base portion 154 and the top portion 152 have approximately the same width. The width of the top portion 152, shown as $W_1$ in FIG. 1a, can be at least about 0.01, at least about 0.05, or at least about 0.10 inches and/or not more than about 0.25, not more than about 0.20, or not more than about 0.15 inches, or it can be in the range of from about 0.01 to about 0.25 inches, about 0.05 to about 0.20 inches, or from about 0.10 to about 0.15 inches. Alternatively, the width of the top portion 152 may be at least about 0.5, at least about 0.75, at least about 1, at least about 1.5 and/or not more than about 3, not more than about 2.5, not more than about 2, not more than about 1.5, or not more than about 1 inch, or it can be in the range of from about 0.5 to about 3 inches, about 0.75 to about 2.5 inches, about 1 to about 2 inches, or about 1 to about 1.5 inches.

The width of the base portion 154, shown as $W_2$ in FIG. 1a, can be at least about 0.5, at least about 0.75, at least about 1, at least about 1.5 and/or not more than about 3, not more than about 2.5, not more than about 2, not more than about 1.5, or not more than about 1 inch, or it can be in the range of from about 0.5 to about 3 inches, about 0.75 to about 2.5 inches, about 1 to about 2 inches, or about 1 to about 1.5 inches. The height of the pouch 150, shown as H in FIG. 1b, can be at least about 2, at least about 3, at least about 4, or at least about 4.5 inches and/or not more than about 12, not more than about 10, or not more than about 8 inches, or it can be in the range of from about 2 to about 12 inches, about 3 to about 10 inches, about 4 to about 8 inches. Pouches of other dimensions may also be suitable in various cases.

In other embodiments, the packages used may include trays. Trays generally have a top and a bottom and a general prism-like shape. Trays can have a square, rectangular, or elliptical cross-section, although other shapes may be suitable. One example of a tray 250 is illustrated in FIGS. 2a-d. Each tray may have a single compartment for holding the foodstuff or other item to be heated, as shown in FIGS. 2a-d, or it may include two or more compartments at least partially isolated from one another (not shown).

In some cases, tray 250 may have a top that is longer and wider than its bottom so that it has a generally trapezoidal shape, as generally shown in FIGS. 2a-d. As used herein, the terms "length" and "width" refer to the longest and second longest, respectively, non-diagonal dimensions of a package. When the tray has a trapezoidal shape such that the top is longer and wider than the bottom, the length and width are measured at the largest cross-section (usually the top surface). The height is the shortest non-diagonal dimension measured perpendicular to the planes defined by the length and width. The length (L), width (W), and height (h) of tray 250 are shown in FIGS. 2a-d.

The length (L) of each tray can be at least about 1, at least about 2, at least about 4, or at least about 6 inches and/or not more than about 18, not more than about 12, not more than about 10, not more than about 8, or not more than about 6 inches, or it can be in the range of from about 1 to about 18 inches, about 2 to about 12 inches, about 4 to about 10 inches, or about 6 to about 8 inches. The width (W) of each tray may be at least about 1 inch, at least about 2 inches, at least about 4 inches, at least about 4.5 inches, or at least 5 inches and/or not more than about 12 inches, not more than about 10 inches, not more than about 8 inches, or not more than 6 inches, or it can be in the range of from about 1 inch to about 12 inches, about 2 inches to about 10 inches, about 4 inches to about 8 inches, about 4.5 inches to about 6 inches, or about 5 inches to about 6 inches. Each tray may have a height (h) of at least about 0.5 inches, at least about 1 inch, at least about 1.5 inches and/or not more than about 8 inches, not more than about 6 inches, or not more than about 3 inches, or it can be in the range of from about 0.5 to about 8 inches, about 2 to about 6 inches, or 1.5 to 3 inches. Trays of other dimensions may also be suitable, depending on the particular application.

When the energy control element is part of the package, whether a pouch, a tray, or other container, it may cover all or a portion of the total surface area of the package. For example, the energy control element may cover at least about 5, at least about 10, at least about 15, at least about 20, at least about 25, at least about 30, at least about 35, at least about 40, at least about 45, at least about 50, at least about 55, at least about 60, at least about 65, at least about 70, at least about 75, at least about 80, at least about 85, at least about 90, or at least about 95 percent of the total surface are of the package. In some cases, it may cover the entire surface area of the package.

Additionally, or in the alternative, the energy control element may cover not more than about 95, not more than about 90, not more than about 85, not more than about 80, not more than about 75, not more than about 70, not more than about 65, not more than about 60, not more than about 55, not more than about 50, not more than about 45, not more than about 40, not more than about 35, not more than about 30, not more than about 25, not more than about 20, not more than about 15, not more than about 10, or not more than about 5 percent of the total surface area of the package.

Energy control elements can be in any suitable shape. In some cases, the energy control elements in the form of strips that are printed, labeled, laminated, or otherwise incorporated into all or a portion of the package. In some embodiments, these types of energy control elements may be microwave enhancing elements and can be formed from a metallic material. Such energy control elements may be incorporated into or onto all or a portion of the package surface by printing, by lamination, or by application of labels that include the strips. In some cases, lamination may be used with flexible packages, while labels and printing may be used for rigid packaging. When the package includes a tray and a lid, the energy control strips may be present on the lid, on the tray, or on both the tray and the lid. An example of a tray 252 including a plurality of energy control strips 260 is shown in FIGS. 3 and 4.

Although only covering one portion of the tray 252 in the embodiment shown in FIGS. 3 and 4, it should be understood that the energy control strips 260 may cover more or less of the surface area of the tray 252, or may be positioned at different locations. Alternatively, or in addition, one or more of the energy control elements may be in a different shape, and/or the package may be a pouch or other type of container.

When the energy control elements are present as strips, the package may include at least 2, at least 3, at least 4, at least 5, at least 6, at least 7, at least 8, at least 9, at least 10, at least 11, or at least 12 or more strips that are spaced apart from one another along at least one surface of the package. Each of the strips may have a width, or second longest dimension, of at least about 1/64, at least about 1/32, or at least about 1/16 of an inch and/or not more than about 1/2, not more than about 1/4, or not more than about 1/8 of an inch. The size of each strip may be the same as the others, or one or more may have a different width. The strips may be spaced such that there are at least 2, at least 3, at least 4, at least 5, or at least 6 strips and/or not more than 15, not more than 14, not more than 12, or not more than 10 strips per the predominant wavelength of microwave energy to which the package is exposed during at least one heating step. In some cases, the predominant wavelength of which microwave energy to which the package can be exposed during at least one heating step is at least about 1.4, at least about 1.5, at least about 1.6, or at least about 1.65 inches and/or not more than about 2, not more than about 1.9, not more than about 1.8, or not more than about 1.75 inches.

In some cases, the spacing between adjacent strips may be as wide as, or wider than, the width of each strip. Further, the spacing between sets of adjacent strips may be the same or different. In some cases, the width of the open area between adjacent energy control strips can be at least about 10, at least about 15, at least about 20, at least about 25, at least about 30, at least about 35, at least about 40, at least about 45, or at least about 50 percent wider than the average width of the two adjacent energy control strips. Alternatively, or in addition, the width of the open area between adjacent energy control strips can be not more than about 90, not more than about 85, not more than about 80, not more than about 75, not more than about 70, not more than about 65, or not more than about 60 percent wider than the average width of the two adjacent energy control strips.

The packaged foodstuff may be configured such that one or more foodstuffs in the package are positioned near the energy control element. For example, the energy control element may be positioned such that at least about 5, at least about 10, at least about 15, at least about 20, at least about 25, at least about 30, at least about 35, at least about 40, at least about 45, at least about 50, at least about 55, at least about 60, at least about 65, at least about 70, at least about 75, at least about 80, at least about 85, at least about 90, at least about 95, or up to 100 percent of at least one foodstuff is positioned near the energy control element.

Alternatively, part of the foodstuff (or another foodstuff) may not be positioned near the energy control element. For example, at least about 5, at least about 10, at least about 15, at least about 20, at least about 25, at least about 30, at least about 35, at least about 40, at least about 45, at least about 50, at least about 55, at least about 60, at least about 65, or at least about 75 percent of the foodstuff in a package may not be positioned near the energy control element. This may occur when, for example, the package includes two or more different foodstuffs in a single or multi-compartment tray or pouch. Alternatively, the package may include two or more energy control elements (of the same or a different type) each positioned near different types of foodstuff. In this way, the temperature and heating profile of different foodstuffs within a single package can be effectively controlled to achieve more efficient and uniform heating of the foodstuff or other item within the package.

In some cases, the energy control element may be part of a carrier used to secure and transport the articles through a microwave heating system. Carriers may be used in larger-scale microwave heating systems configured for the pasteurization or sterilization of packaged foodstuffs and other items. Several views of an exemplary carrier are provided in FIGS. 5-10. As particularly shown in FIGS. 5 and 6, the carrier 10 includes an outer frame 12, an upper support structure 14, and a lower support structure (not shown). The outer frame 12 comprises two spaced-apart side members 18a,b and two spaced-apart end members 20a,b. The first and second end members 20a,b may be coupled to and extend between opposite ends of first and second side members 18a,b to form outer frame 12. When each of side members 18a,b are longer than the end members 20a,b, the frame may have a generally rectangular shape, as shown FIGS. 5 and 6.

Figure 8:
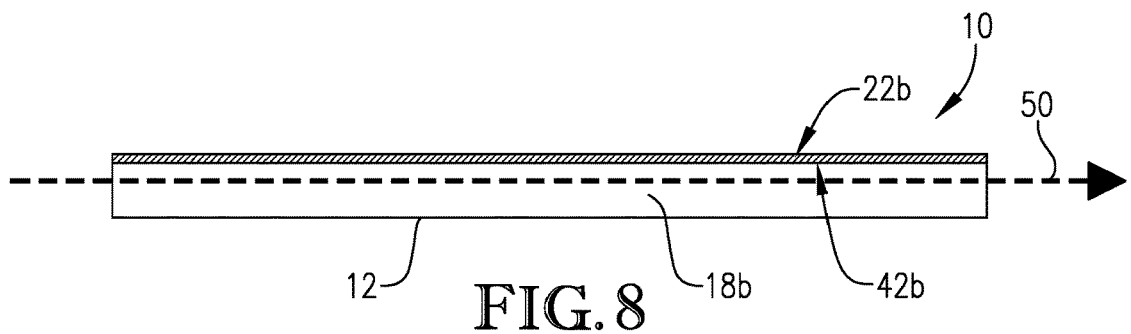
FIG. 8 is a side view of the carrier shown in FIGS. 5-7.
Figure 9:
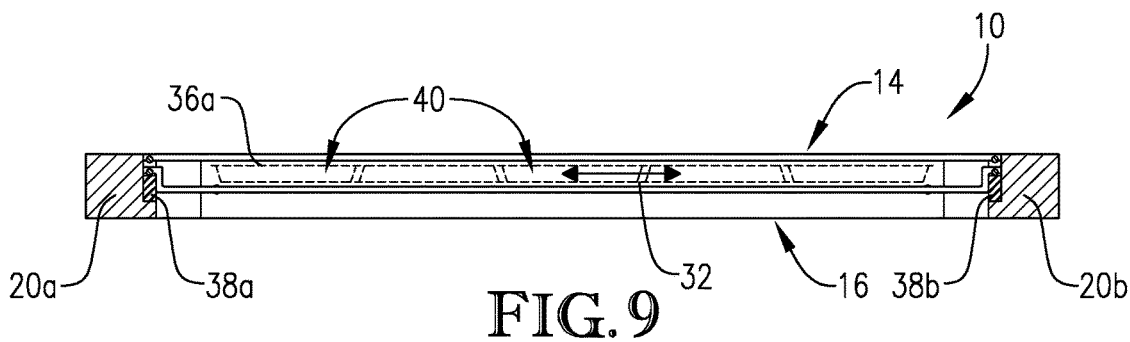
FIG. 9 is a longitudinal cross-sectional view of the carrier shown in FIGS. 5-8.

As shown in FIGS. 5, 6, 7, and 10, first and second side members 18a,b each include respective support projections 22a,b that are configured to engage respective first and second convey line support members, which are represented by dashed lines 24a and 24b in FIG. 8. The first and second support projections 22a,b of carrier 10 present first and second lower support surfaces 42a,b for supporting carrier 10 on first and second convey line support members 24a,b. Convey line support members 24a,b may be a moving convey line element such as, for example, a pair of chains (not shown) located on each side of carrier 10 as it moves through the microwave heating zone in a direction represented by the arrow in FIG. 8.

The first and second side members 18a,b and first and second end members 20a,b may be formed of any suitable material including, for example, a low loss material having a loss tangent of not more than about $10^{-4}$, not more than about $10^{-3}$, or not more than about $10^{-2}$, measured at 20° C. Each of the side members 18a,b and end members 20a,b may be formed of the same material, at least one may be formed of a different material. Examples of suitable low loss tangent materials may include, but are not limited to, various polymers and ceramics. In some embodiments, the low loss tangent material may be a food-grade material.

When the low loss material is a polymeric material, it may have a glass transition temperature of at least about 80° C., at least about 100° C., at least about 120° C., at least about 140° C., or at least about 160° C., at least about 165° C., in order to withstand the elevated temperatures to which the carrier may be exposed during heating of the articles. Suitable low loss polymers can include, for example, polytetrafluoroethylene (PTFE), polysulfone, polynorbornene, polycarbonate (PC), acrylonitrile butadiene styrene (ABS), poly(methyl methacrylate) (PMMA), polyetherimide (PEI), polystyrene, polyvinyl alcohol (PVA), polyvinyl chloride (PVC), and combinations thereof. The polymer can be monolithic or it may be reinforced with glass fibers, such as, for example glass-filed PTFE ("TEFLON"). Ceramics, such as aluminosilicates, may also be used as the low loss material.

Figure 5:
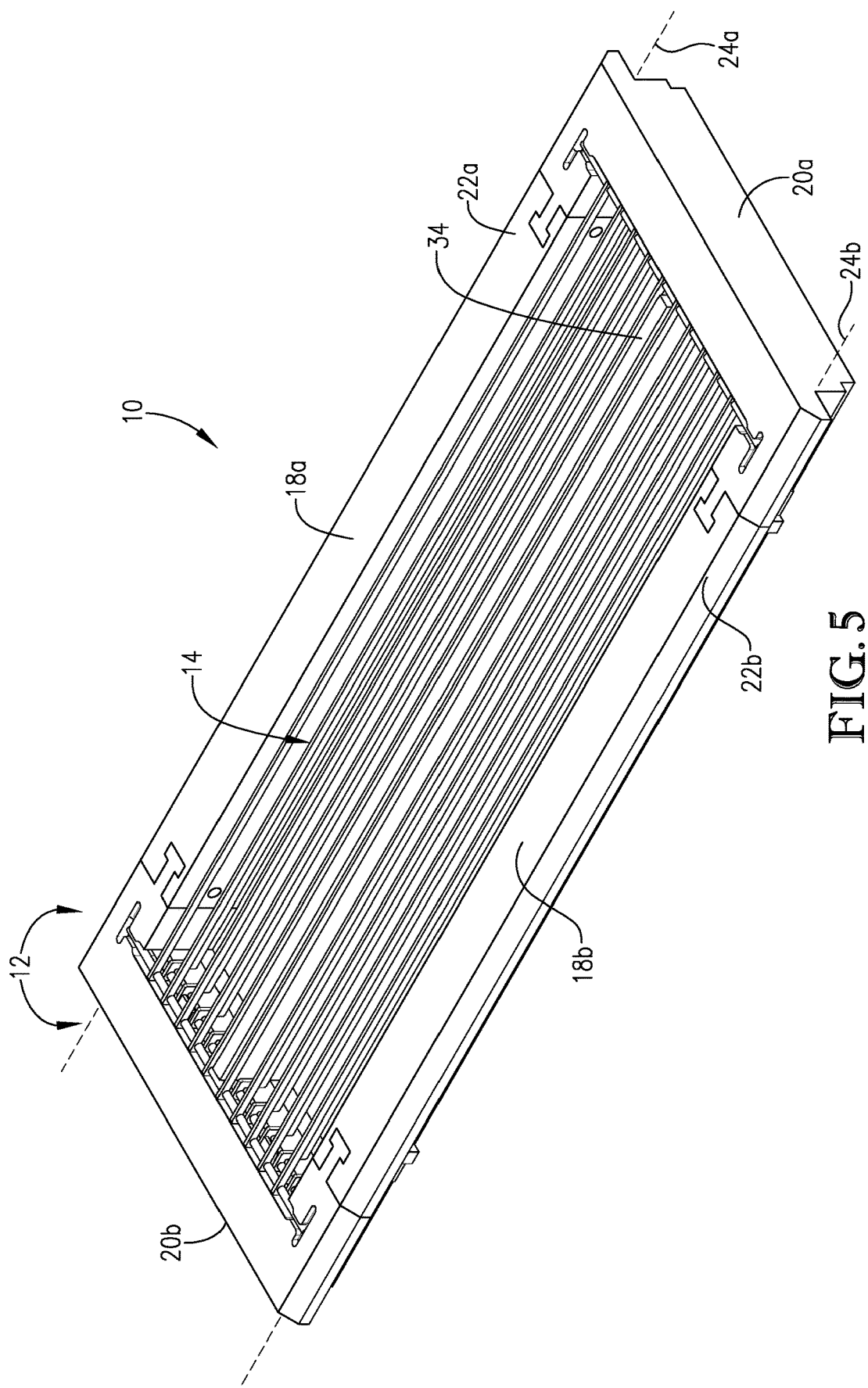
FIG. 5 is a top front isometric view of a carrier suitable for use in one or more embodiments of the present invention.
Figure 6:
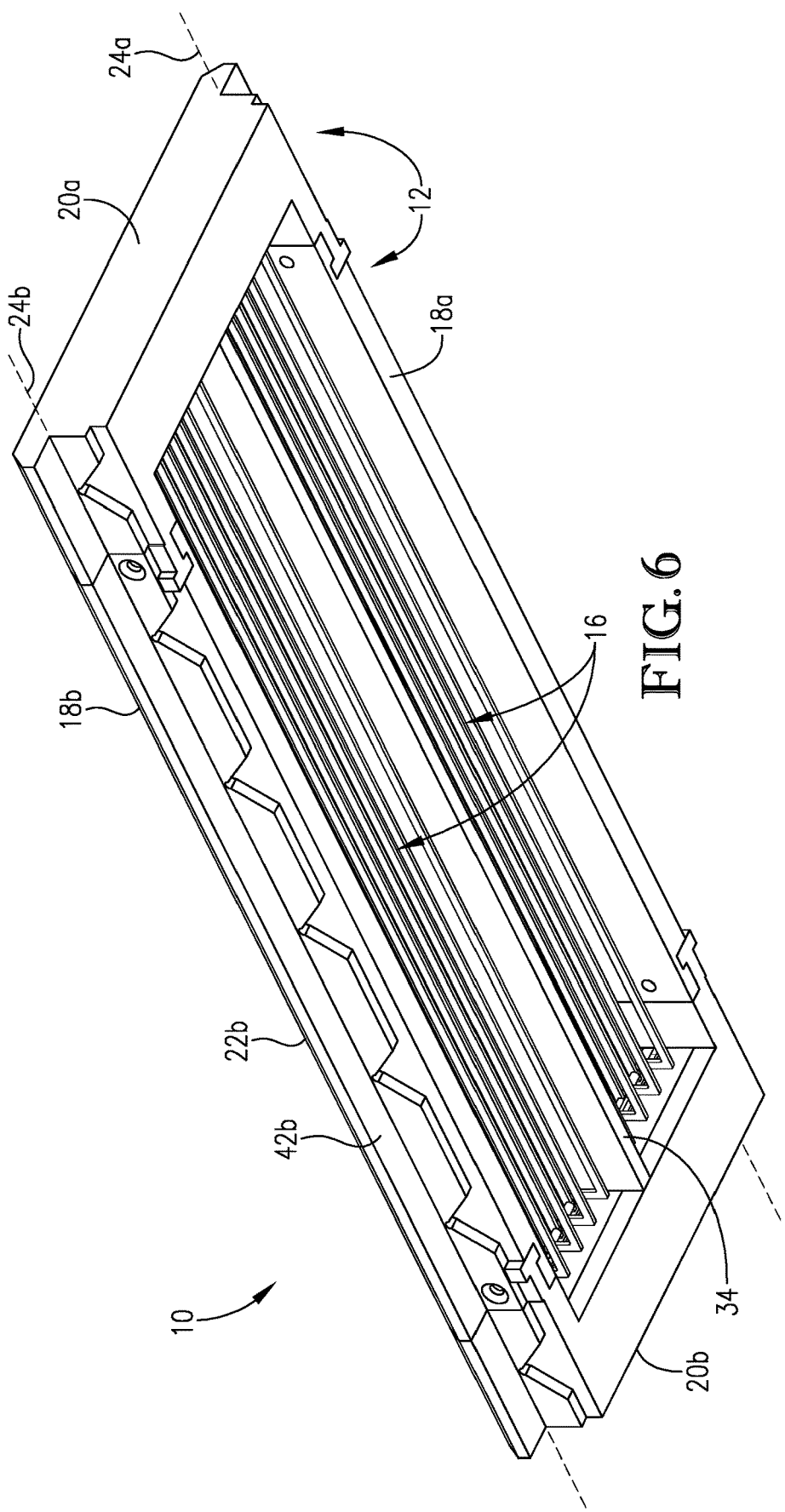
FIG. 6 is a bottom front isometric view of the carrier shown in FIG. 5.
Figure 7:
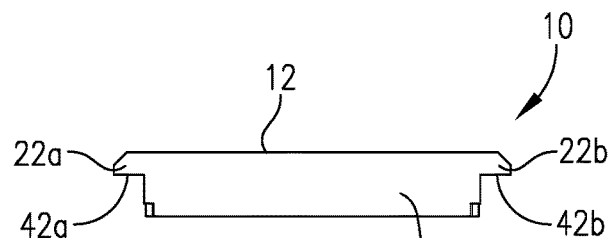
FIG. 7 is an end view of the carrier shown in FIGS. 5 and 6.

As shown in FIGS. 5 and 6, the carrier 10 may include an upper support structure 14 and a lower support structure 16 for holding a group of articles within the carrier, while also permitting microwave energy pass through the carrier 10 to the articles. In the example shown in FIGS. 5 and 6, the upper and lower support structures 14, 16 may each include a plurality of support members extending between the end members 20a,b in a direction substantially parallel to the side members 18a,b. The support members may extend in a direction substantially perpendicular to the end members 20a,b. As used herein, the terms "substantially parallel" and "substantially perpendicular" mean within 5° of being parallel or perpendicular, respectively. In other instances (not shown), upper and lower support structures 14, 16 could include a grid member or substantially rigid sheets of a microwave transparent or semi-transparent material extending between the side members 18a,b and end members 20a,b. Additional details regarding the number, dimensions, and configurations of support structures 14 and 16 are provided in U.S. patent application Ser. No. 15/284,173, the entirety of which is incorporated herein by reference.

When the upper and/or lower support structures 14, 16 include individual support members as shown in FIGS. 5 and 6, one or more of the support members may be formed of a strong, electrically conductive material. Suitable electrically conductive materials can have a conductivity of at least about $10^3$ Siemens per meter (S/m), at least about $10^4$ S/m, at least about $10^5$ S/m, at least about $10^6$ S/m, or at least about $10^7$ S/m at 20° C., measured according to ASTM E1004 (09). Additionally, the electrically conductive material may have a tensile strength of at least about 50 MegaPascals (MPa), at least about 100 MPa, at least about 200 MPa, at least about 400 MPa, or at least about 600 MPa, measured according to ASTM E8/E8M-16a, and/or it may also have a yield strength of at least about 50, at least about 100, at least about 200, at least about 300, or at least about 400 MPa at 20° C., measured according to ASTM E8/E8M-16a. The Young's Modulus of the electrically conductive material can be at least about 25 GigaPascals (GPa), at least about 50 GPa, at least about 100 GPa, or at least about 150 GPa and/or not more than about 1000 GPa, not more than about 750 GPa, not more than about 500 GPa, or not more than about 250 GPa, measured at 20° C., measured according to ASTM E111-04 (2010). The electrically conductive material may be metallic and, in some cases, may be a metal alloy. The metal alloy may include any mixture of suitable metal elements including, but not limited to, iron, nickel, and/or chromium. The electrically conductive material may comprise stainless steel and may be food-grade stainless steel.

Figure 10:
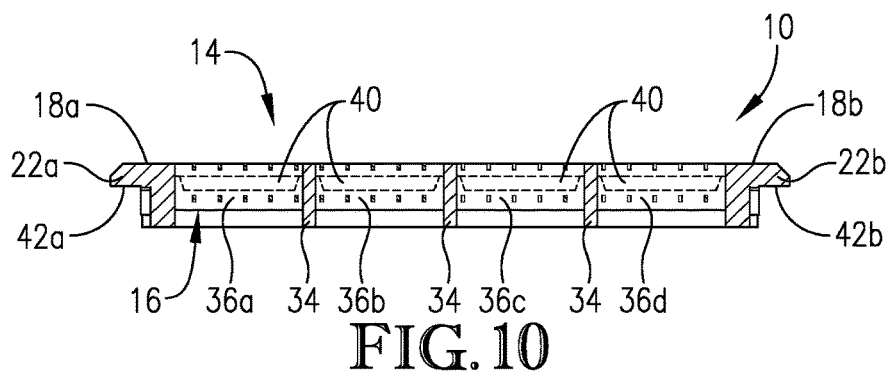
FIG. 10 is a transverse cross-sectional view of the carrier shown in FIGS. 5-9.

As particularly shown in FIGS. 7-10, carrier 10 defines a cargo volume 32 for receiving and holding a plurality of articles 40. Cargo volume 32 is at least partially defined between the upper and lower support structures 14 and 16, which are vertically spaced apart from one another, and the side 18*a,b* and end 20*a,b* members. The articles received in cargo volume 32 may be in contact with and/or held in position by at least a portion of the individual support members present in the upper and lower support structures 14 and 16. Each of upper and lower support structures 14, 16 may be coupled to outer frame 12 in a removable or hinged manner so that at least one of the upper and lower support structures 14, 16 may be opened to load the articles 40 into carrier 10, closed to hold the articles 40 during heating, and opened again to unload the articles 40 from the carrier. In some embodiments, as shown in FIG. 10, the use of one or more longitudinal dividers 34 may create multiple compartments 36*a-d* within cargo volume 32 for receiving multiple rows of articles 40.

Cargo volume 32 can be of any suitable size. In some cases, it can have a length measured between opposing internal surfaces of the first and second end members 20*a,b*, in the range of from about 0.5 to about 10 feet, about 1 to about 8 feet, or about 2 to about 6 feet. The cargo volume 32 may also have a width measured between opposing internal surfaces of the first and second side members 18*a,b*, in the range of from about 0.5 to about 10 feet, about 1 to about 8 feet, or from about 2 to about 6 feet. The height of the cargo volume, which can be measured between opposing internal surfaces of the upper and lower support structures 14, 16, can be in the range of from about 0.50 to about 8, from about 0.75 to about 6, from about 1 to about 4, or from about 1.25 to about 2 inches. Overall, the cargo volume can have a total volume in the range of from about 2 to about 30 cubic feet, about 4 to about 20 cubic feet, about 6 to about 15 cubic feet, or about 6.5 to about 10 cubic feet.

Additionally, in some embodiments, the carrier may further include at least one article spacing member 34 for adjusting the size and/or shape of the cargo volume 32. Examples of article spacing members include dividers 34, as shown in FIGS. 5, 6, and 10, for dividing the cargo volume 32 into two or more compartments and vertical spacers, such as 38*a,b* shown in FIG. 9, for adjusting the vertical height between the upper and lower support structures 14, 16. When present, the article spacing member or members 34 may be permanently or removably coupled to the outer frame 12 or at least one of the upper and lower support structures 14, 16. When an article spacing member, such as a divider 34 or a vertical spacer 38, is removably coupled to the outer frame 12 and/or to the upper and lower support members 14, 16, it may be selectively inserted into and removed from the carrier 10 in order to change the size and/or shape of the cargo volume 32 so that the carrier 10 may hold many types of articles having different sizes and/or shapes. Further details regarding such carriers are provided in the '173 Application.

When loaded into a carrier as described herein, the articles are placed within the cargo volume 32 defined between the upper and lower support structures of the carrier. As discussed above, the cargo volume may be a single volume, or it may be divided into two or more compartments, such as 36*a-d* shown in FIG. 10, using one or more dividers 34. When loaded into the cargo volume 32, the articles may be placed in single rows along the length of the carrier. In some embodiments, the articles may be arranged in at least 2, at least 3, at least 4, at least 5, or at least 6 single rows and/or not more than 15, not more than 12, not more than 10, or not more than 8 single rows, or from 2 to 15 single rows, from 3 to 12 single rows, from 4 to 10 single rows, or from 5 to 8 single rows. Overall, each carrier may hold a total of at least 6, at least 8, at least 10, at least 12, at least 16, at least 18, at least 20, at least 24, at least 30 articles and/or not more than 100, not more than 80, not more than 60, not more than 50, or not more than 40 articles, or it can hold from 6 to 100 articles, from 8 to 80 articles, from 10 to 60 articles, from 12 to 50 articles, or from 18 to 40 articles. Articles can be loaded into the carrier in any suitable manner, including manually or using an automated device.

When loaded into a carrier, each of the articles loaded into the cargo volume may be similar, or two or more articles may be different from one another. In some cases, the articles loaded into a carrier may include a first group of a first type of article and a second group of a second type of article, with the first type of article and second type of article having different packages and/or different types of contents within the packages. The articles may be spaced apart from one another within the carrier, or one or more articles may contact at least a portion of one or more other articles. It may be desirable, in some cases, to minimize spacing between the articles so that the average distance between consecutive edges of adjacent articles loaded in the carrier can be not more than about 1 inch, not more than about 0.75 inches, not more than about 0.5 inches, not more than about 0.25 inches, or not more than about 0.1 inch. There may be no gaps between the articles such that adjacent articles are in contact with one another when loaded into the carrier, or at least a portion of adjacent articles may overlap horizontally.

Figure 11:
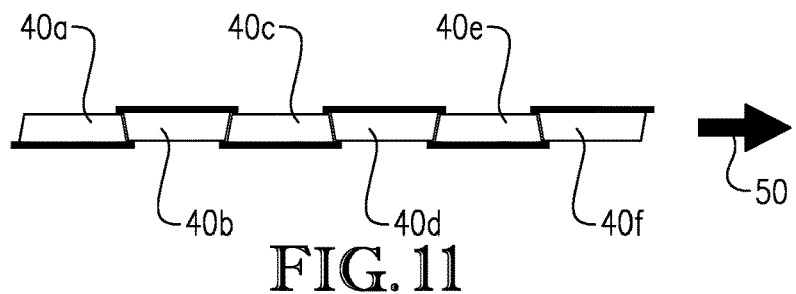
FIG. 11 is a side view of a plurality of articles arranged in a nested configuration.

The particular arrangement of the articles within the cargo space may depend, at least in part, on the shape of the articles. For example, when the articles have a general trapezoidal-like shape, such that the articles are longer and wider on the top than on the bottom, the articles may be arranged in a nested configuration. FIG. 11 provides a side view of one row of articles 40*a-f* arranged in a nested configuration.

In the nested configuration, adjacent articles have opposite orientations. In the nested configuration, the articles 40*a-f* loaded into the carrier are sequentially oriented in the direction of travel, indicated by the arrow 50 in FIG. 11, in a top down, top up, top down, top up configuration. As shown in FIG. 11, the bottom of the second article 40*b* is oriented between the top of the first article 40*a* and the top of the third article 40*c*. Additionally, in the nested configuration, the tops of one set of alternating articles 40*b, d, f* and the bottoms of the other set of alternating articles 40*a, c, e* contact the upper support structure, while the bottoms and tops of each set of alternating articles contact the lower support structure when articles are loaded into the carrier.

Figure 12:
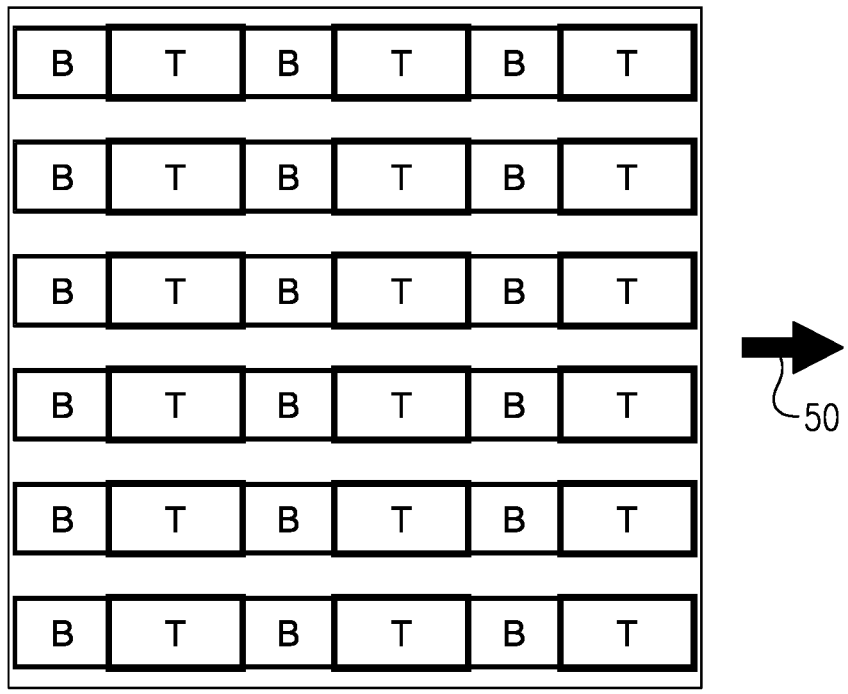
FIG. 12 is a is a top view of a plurality of articles arranged in a nested configuration, particularly illustrating a divided row nested configuration.
Figure 13:
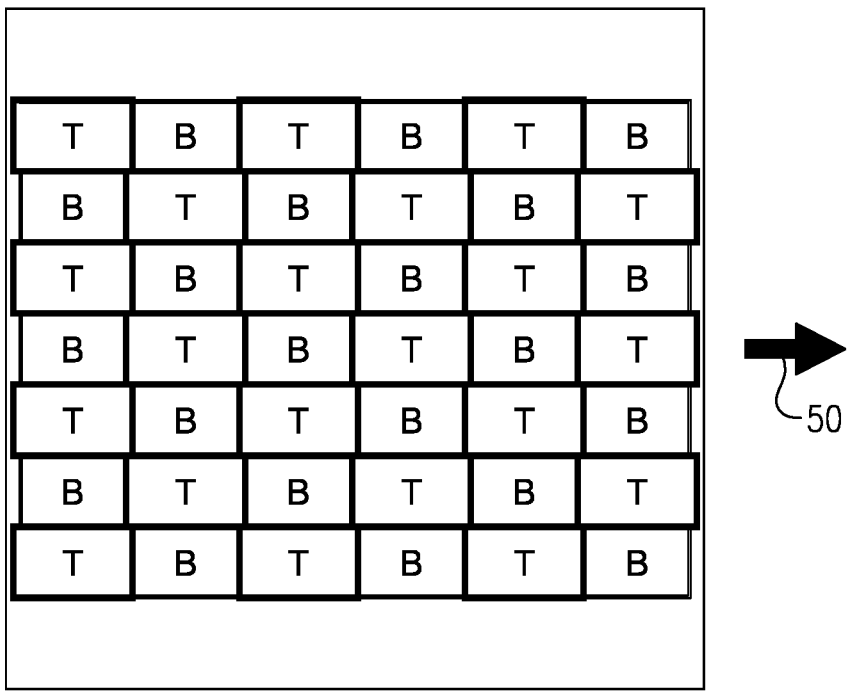
FIG. 13 is a top view of another plurality of articles arranged in a nested configuration, particularly illustrating a full or continuous nested configuration.

Two top views of a plurality of articles arranged in different nested configurations in a carrier are provided in FIGS. 12 and 13. In each of FIGS. 12 and 13, the tops of articles are marked with a "T," the bottoms articles are marked with a "B," and the direction of travel of the carrier is shown by the arrow 50. In the example shown in FIG. 12, the articles are arranged in several spaced-apart rows that are each arranged in a nested configuration, and FIG. 13 shows a fully nested article pattern, wherein the individual rows of nested articles are not spaced from one another and the articles are arranged in a nested configuration in both the longitudinal and transverse directions.

As discussed previously, articles as described herein may be heated in a microwave heating system used to pasteurize and/or sterilize the articles. In general, pasteurization involves the rapid heating of a material to a minimum temperature between 80° C. and 100° C., while sterilization involves heating the material to a minimum temperature between about 100° C. and about 140° C. Some of the microwave systems described herein may be used for pasteurization or for sterilization. In some cases, pasteurization and sterilization may take place simultaneously, or nearly simultaneously, so that the articles being processed are both pasteurized and sterilized by the heating system.

Figure 14A:
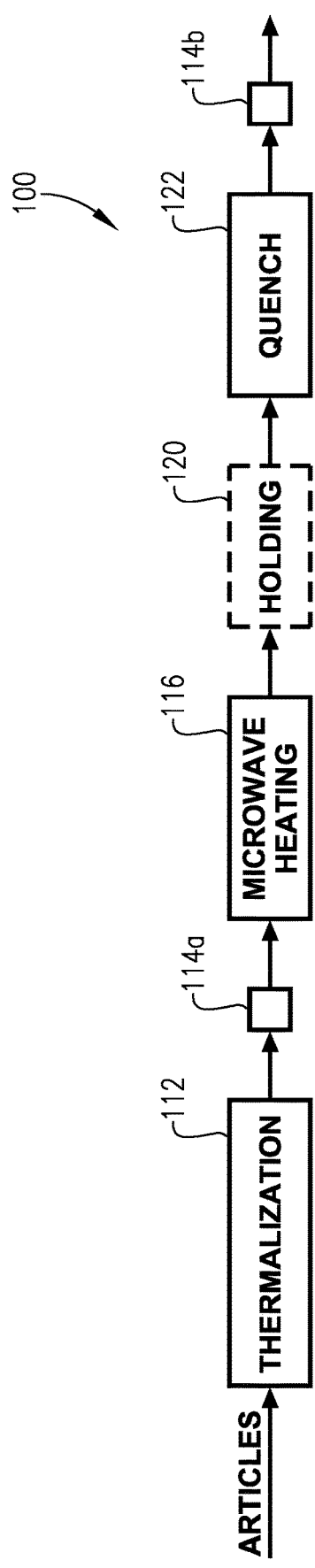
FIG. 14a is a schematic depiction of the major steps of a method for microwave pasteurizing or sterilizing a packaged foodstuff according to embodiments of the present invention.
Figure 14B:
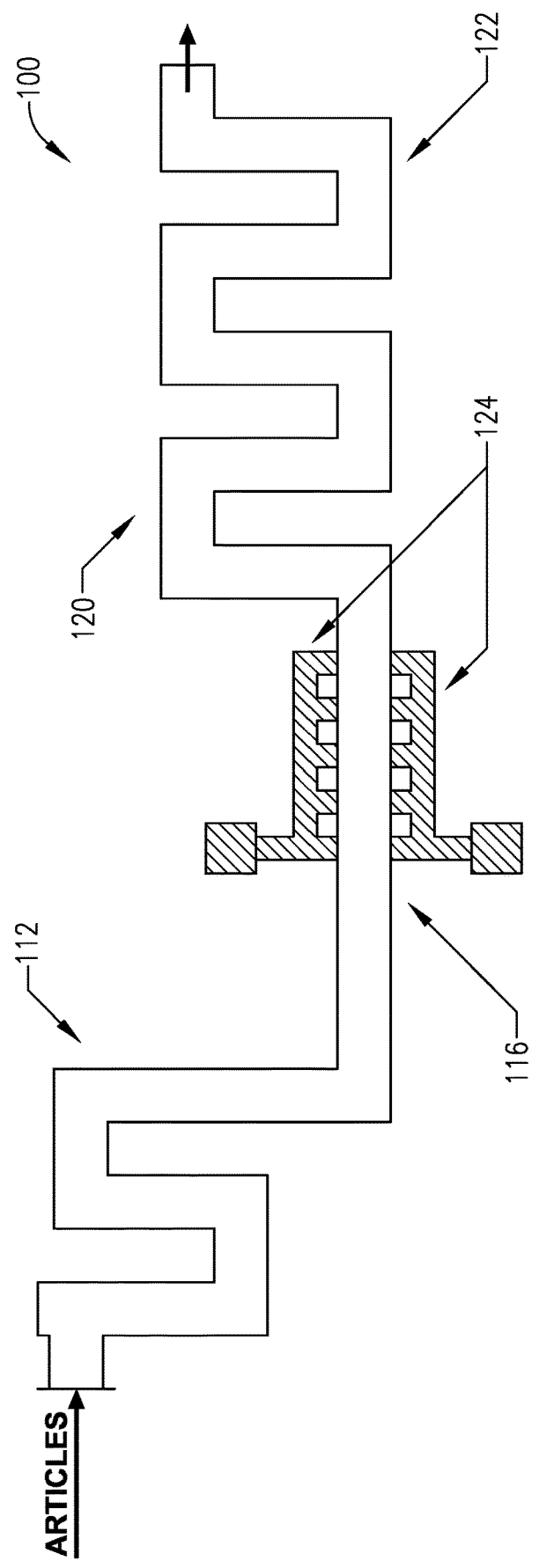
FIG. 14b is a schematic depiction of the major zones of a system for microwave pasteurizing or sterilizing a packaged foodstuff according to embodiments of the present invention.

Turning now to FIGS. 14a and 14b, schematic diagrams of the main steps of a microwave heating process and the main elements of a microwave heating system suitable for pasteurizing and/or sterilizing articles according to embodiments of the present invention are provided. As used herein, the term "microwave energy" generally refers to electromagnetic energy having a frequency between 300 MHz and 30 GHz.

As shown in FIGS. 14a and 14b, the articles loaded into one or more carriers can initially be introduced into a thermalization zone 112, wherein the articles can be thermalized to a substantially uniform temperature. Once thermalized, the articles can optionally be passed through a pressure adjustment zone 114a before being introduced into a microwave heating zone 116. In microwave heating zone 116, the articles can be rapidly heated using microwave energy discharged into at least a portion of the heating zone by one or more microwave launchers, as generally shown as launchers 124 in FIG. 14b. The heated articles can then be passed through a holding zone 120, wherein the coldest portion of each article can be maintained at a temperature at or above a predetermined target temperature (e.g., a pasteurization or sterilization target temperature) for a specified amount of time. The articles can also be passed to a quench zone 122, wherein the temperature of the articles can be quickly reduced to a suitable handling temperature. Thereafter, the cooled articles can optionally be passed through a second pressure adjustment zone 114b before being removed from the system.

The above-described thermalization, microwave heating, holding, and/or quench zones of the microwave system depicted in FIGS. 14a and 14b can be defined within a single vessel, or at least one of the above-described stages or zones can be defined within one or more separate vessels. Additionally, in some cases, at least one of the above-described steps can be carried out in a vessel that is at least partially filled with a liquid medium in which the articles being processed can be at least partially submerged. As used herein, the term "at least partially filled" denotes a configuration where at least 50 percent of the volume of the specified vessel is filled with a liquid medium. In certain embodiments, the volume of at least one of the vessels used in the thermalization zone, the microwave heating zone, the holding zone, and the quench zone can be at least about 75 percent, at least about 90 percent, at least about 95 percent, or 100 percent filled with a liquid medium.

The liquid medium used may be any suitable liquid medium. For example, the liquid medium may have a dielectric constant greater than the dielectric constant of air and, in one embodiment, can have a dielectric constant similar to the dielectric constant of the articles being processed. Water (or a liquid medium comprising water) may be particularly suitable for systems used to heat consumable articles. The liquid medium may also include one or more additives, such as, for example, oils, alcohols, glycols, and salts in order to alter or enhance its physical properties (e.g., boiling point) at the conditions of operation.

The microwave heating systems as described herein may include at least one conveyance system (not shown in FIGS. 14a and 14b) for transporting the articles through one or more of the processing zones described above. Examples of suitable conveyance systems can include, but are not limited to, plastic or rubber belt conveyors, chain conveyors, roller conveyors, flexible or multi-flexing conveyors, wire mesh conveyors, bucket conveyors, pneumatic conveyors, screw conveyors, trough or vibrating conveyors, and combinations thereof. Any suitable number of individual convey lines can be used with the conveyance system, and the convey line or lines may be arranged in any suitable manner within the vessels.

In operation, the loaded carriers introduced into the microwave system depicted in FIGS. 14a and 14b are initially introduced into a thermalization zone 112, wherein the articles are thermalized to achieve a substantially uniform temperature. For example, at least about 85 percent, at least about 90 percent, at least about 95 percent, at least about 97 percent, or at least about 99 percent of all the articles withdrawn from the thermalization zone 112 have a temperature within about 5° C., within about 2° C., or within 1° C. of one another. As used herein, the terms "thermalize" and "thermalization" generally refer to a step of temperature equilibration or equalization.

When the thermalization zone 112 is at least partially filled with a liquid medium, the articles in the carrier passing through the thermalization zone 112 can be at least partially submerged in the liquid during the passing. The liquid medium in the thermalization zone 112 can be warmer or cooler than the temperature of the articles passing therethrough and, in some cases, can have an average bulk temperature of at least about 30° C., at least about 35° C., at least about 40° C., at least about 45° C., at least about 50° C., at least about 55° C., or at least about 60° C. and/or not more than about 100° C., not more than about 95° C., not more than about 90° C., not more than about 85° C., not more than about 80° C., not more than about 75° C., not more than about 70° C., not more than about 65° C., or not more than about 60° C.

The thermalization step can be carried out under ambient pressure or it may be carried out in a pressurized vessel. When pressurized, thermalization may be performed at a pressure of at least about 1, at least about 2, at least about 5, or at least about 10 psig and/or not more than about 80, not more than about 50, not more than about 40, or not more than about 25 psig. When the thermalization zone 112 is liquid filled and pressurized, the pressure may be in addition to any head pressure exerted by the liquid. Articles undergoing thermalization can have an average residence time in the thermalization zone 112 of at least about 30 seconds, at least about 1 minute, at least about 2 minutes, at least about 4 minutes and/or not more than about 20 minutes, not more than about 15 minutes, or not more than about 10 minutes. The articles withdrawn from the thermalization zone 112 can have an average temperature of at least about 20° C., at least about 25° C., at least about 30° C., at least about 35° C. and/or not more than about 70° C., not more than about 65° C., not more than about 60° C., or not more than about 55° C.

When the thermalization zone 112 and microwave heating zone 116 may operate at substantially different pressures, the carrier withdrawn from the thermalization zone may be passed through a pressure adjustment zone 114a before entering the microwave heating zone. When used, the pressure adjustment zone 114a may be any zone or system configured to transition the carrier between an area of lower pressure and an area of higher pressure. The difference between the low and high pressure zones may vary depending on the system and can, for example, be at least about 1 psig, at least about 5 psig, at least about 10 psig, at least about 12 psig and/or not more than about 50 psig, not more than about 45 psig, not more than about 40 psig, or not more than about 35 psig. When the quench zone 122 shown in FIGS. 14*a* and 14*b* is operated at a different pressure than the microwave heating zone 116, another pressure adjustment zone 114*b* may be present to transition the carrier between the microwave heating zone 116 or hold zone 120 and quench zone 122. In some cases, the first pressure adjustment zone 114*a* can transition the carrier from a lower pressure thermalization zone to a higher pressure microwave heating zone, while the second pressure adjustment zone 114*b* may transition the carrier from a higher pressure holding zone 120 (or a higher-pressure portion of the quench zone) to a lower pressure quench zone 122, or portion thereof.

After thermalization, the loaded carrier may be introduced into the microwave heating zone 116, wherein the articles may be heated using a portion of the microwave energy discharged into a microwave heating chamber via one or more microwave launchers. Various configurations of microwave heating systems of the present invention may employ microwave energy having a frequency within one or more of the above ranges, with a frequency of about 915 MHz being preferred. Further, as discussed above, the microwave energy discharged into the microwave heating chamber may be polarized. In addition to microwave energy, the microwave heating zone may optionally utilize one or more other types of heat sources such as, for example, various conductive or convective heating methods of devices. However, it is generally preferred that at least about 50, at least about 55, at least about 60, at least about 65, at least about 70, at least about 75, at least about 80, at least about 85, at least about 90, or at least about 95 percent of the energy used to heat the articles can be microwave energy from a microwave source.

Figure 15:
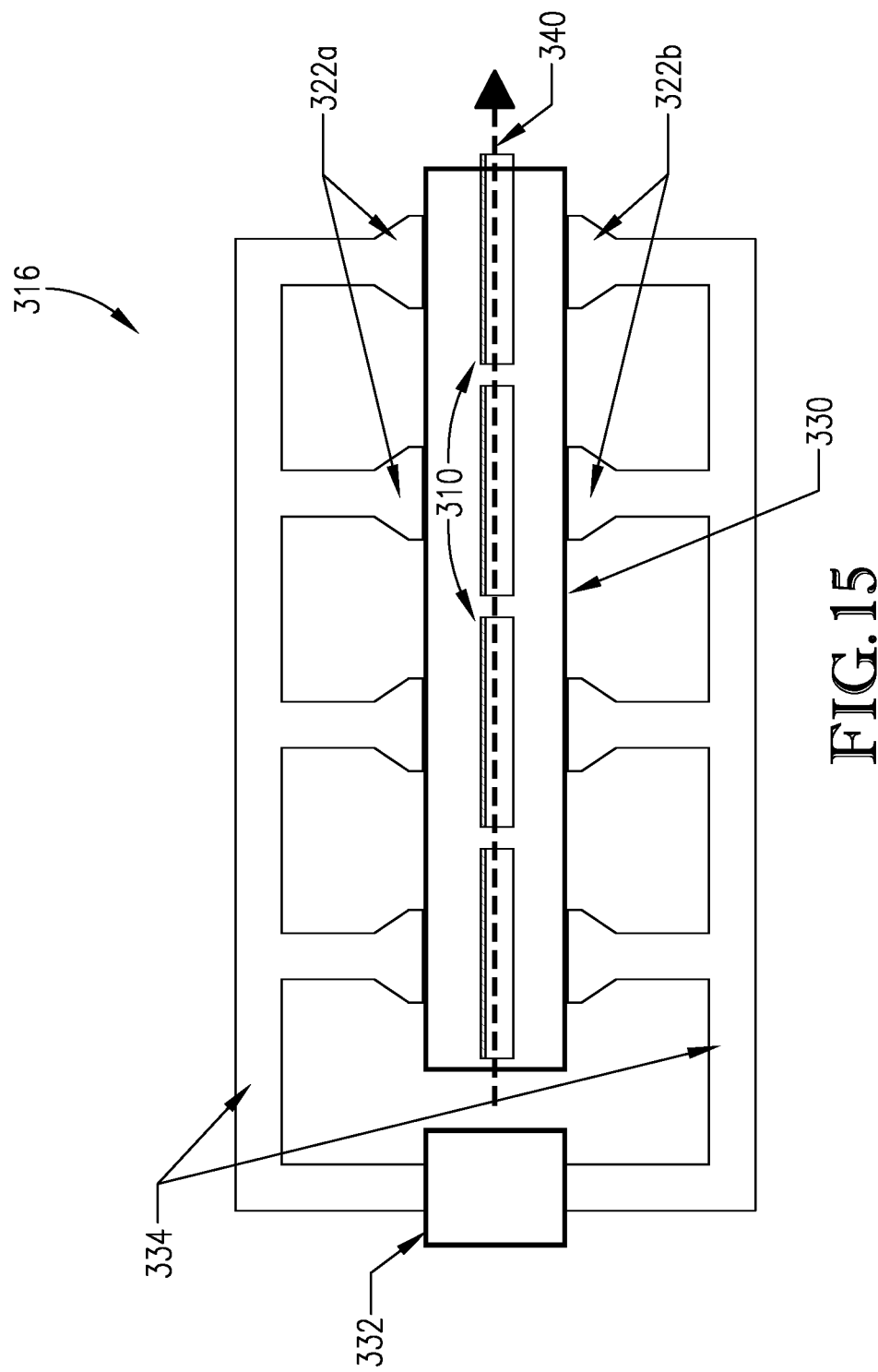
FIG. 15 is a schematic partial side cut-away view of a microwave heating zone configured according to embodiments of the present invention, particularly illustrating one possible arrangement of the microwave heating vessel, the microwave launchers, and the microwave distribution system.

One example of a microwave heating zone 316 suitable for use in the inventive system is schematically illustrated in FIG. 15. The microwave heating zone 316 shown in FIG. 15 generally includes a microwave heating chamber 330, at least one microwave generator 332 for generating microwave energy, and a microwave distribution system 334 for directing at least a portion of the microwave energy from the generator or generators 332 to the microwave heating chamber 330. The system further comprises one or more microwave launchers 322 for discharging microwave energy into the interior of the microwave heating chamber 330. The microwave heating zone 316 may also include a convey system 340 having a convey line with a support for transport a plurality of carriers loaded with groups of articles through the microwave heating zone.

Each microwave launcher 322 may be configured to emit a particular amount of microwave energy into the microwave heating chamber 330. For example, each microwave launcher 322 may be configured to emit at least about 5, at least about 7, at least about 10, at least about 15 kW and/or not more than about 50, not more than about 40, not more than about 30, not more than about 25, not more than about 20, or not more than about 17 kW. When the system includes two or more microwave launchers, each launcher 322 may emit the same amount of energy as one or more other launchers, or at least one launcher may emit a different (e.g., lower or higher) amount of energy, as compared to at least one of the other launchers. Overall, the total amount of energy discharged into the microwave heating chamber 330 can be at least about 25 kW, at least about 30 kW, at least about 35 kW, at least about 40 kW, at least about 45 kW, at least about 50 kW, at least about 55 kW, at least about 60 kW, at least about 65 kW, at least about 70 kW, or at least about 75 kW and/or not more than about 100 kW, not more than about 95 kW, not more than about 90 kW, not more than about 85 kW, not more than about 80 kW, not more than about 75 kW, not more than about 70 kW, or not more than about 65 kW.

When the system includes two or more microwave launchers 322, at least some of the launchers, shown as groups 322*a* and 322*b* in FIG. 15, may be positioned on the same side of the microwave heating chamber 330. These same-side launchers 322*a* or 322*b* may be axially spaced from one another along the length of the microwave heating chamber, in a direction parallel to the direction of travel of the carrier 310 passing through the chamber. The microwave system may also include two or more same-side launchers that are laterally spaced from one another in a direction generally perpendicular to the direction of travel of the carriers through the chamber. Additionally, or in the alternative, the microwave heating system may also include at least two launchers positioned on opposite sides of the microwave chamber. These opposed or oppositely disposed launchers, such as those in groups 322*a* and 322*b* shown in FIG. 15, may be oppositely facing, such that launch openings of the launchers are substantially aligned, or staggered such that the launch openings of opposed launchers are axially and/or laterally spaced from each other.

Figure 16:
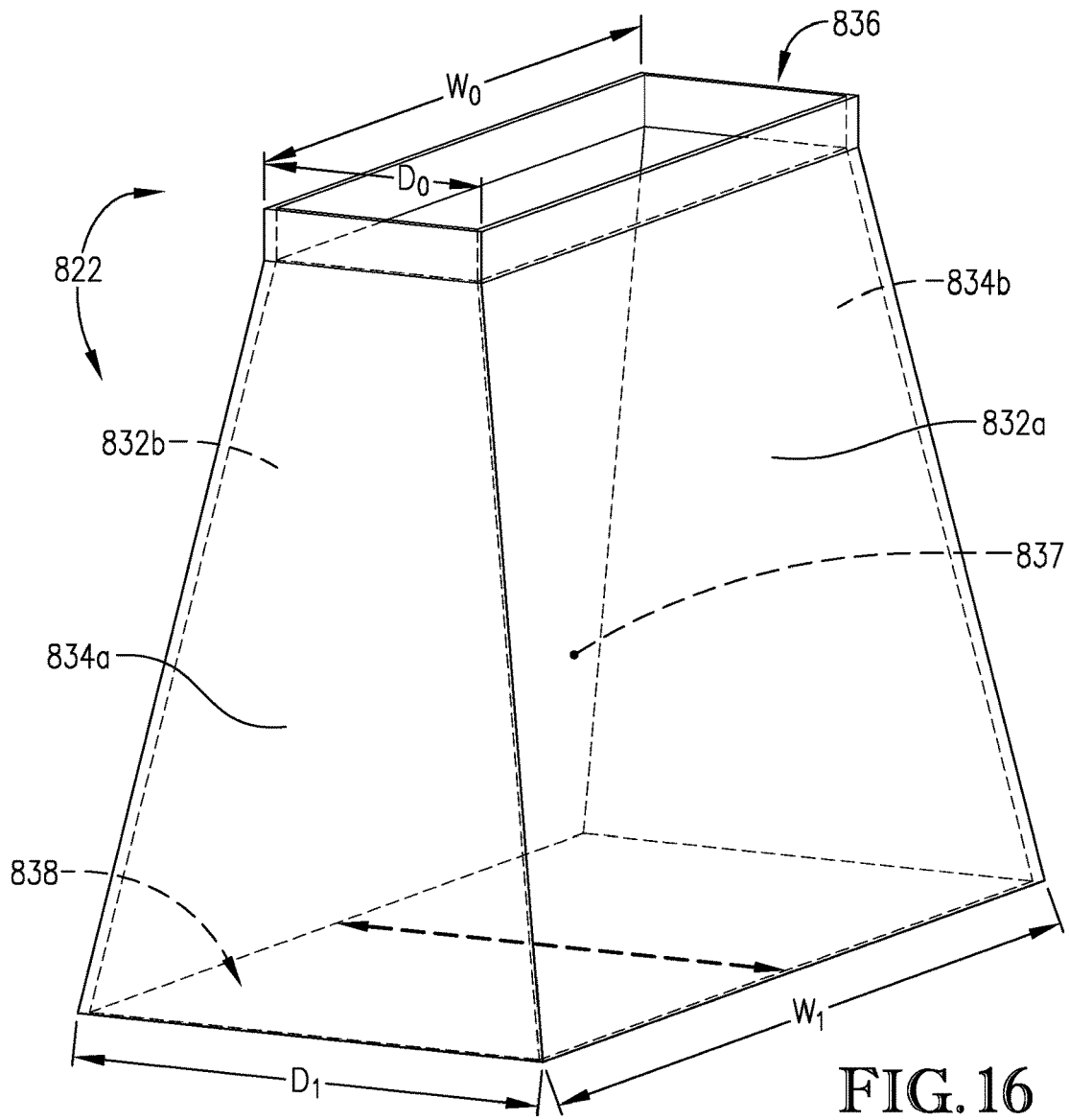
FIG. 16 is an isometric view of a microwave launcher configured according to embodiments of the present invention.

Each of the microwave launchers utilized in the microwave heating zone may be of any suitable configuration. Several exemplary microwave launchers are described with respect to FIGS. 16, 17, and 18*a-c*. Turning first to FIG. 16, one example of a microwave launcher 822 comprises a set of broader opposing sidewalls 832*a,b* and a set of narrower opposing end walls 834*a,b*, which collectively define a substantially rectangular launch opening 838. The launch opening 838 can have a width ($W_1$) and a depth ($D_1$) that are defined by the lower terminal edges of sidewalls 832*a,b* and 834*a,b*, respectively. The depth ($D_1$) of launch opening 838 is less than its width ($W_1$) and is typically oriented in a direction perpendicular to the direction of travel of the carriers moving through the microwave heating chamber. In other words, launch opening 838 may be elongated in the direction of travel of the carriers (or the direction of extension of the microwave chamber), so that the width of the launcher defined by the longer terminal edges of the sidewalls 832*a,b* are oriented parallel to the direction of travel (or the direction of extension), while the depth of the launcher defined by the shorter terminal edges of the end walls 834*a,b* are aligned substantially perpendicular to the direction of travel (or extension).

Figure 17:
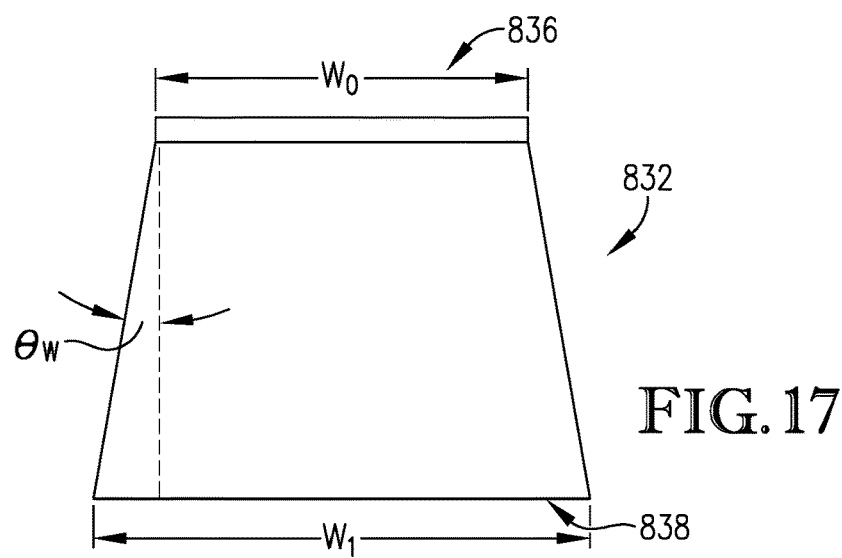
FIG. 17 is a longitudinal side view of the microwave launcher depicted in FIG. 16.
Figure 18A:
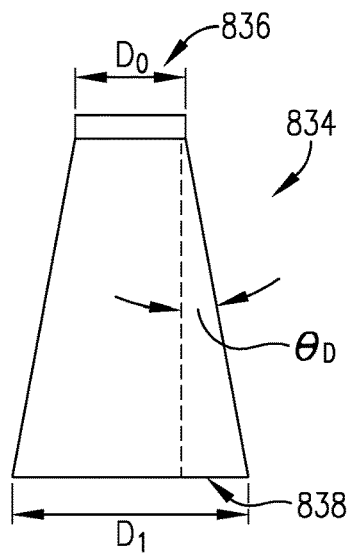
FIG. 18a is an end view of the microwave launcher generally depicted in FIGS. 16 and 17, particularly illustrating a launcher having a flared outlet.
Figure 18B:
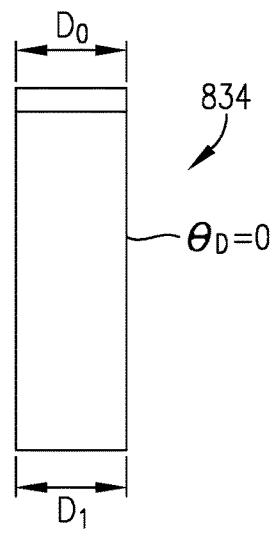
FIG. 18b is an end view of another embodiment of the microwave launcher generally depicted in FIGS. 16 and 17, particularly illustrating a launcher having an inlet and outlet of approximately the same size.
Figure 18C:
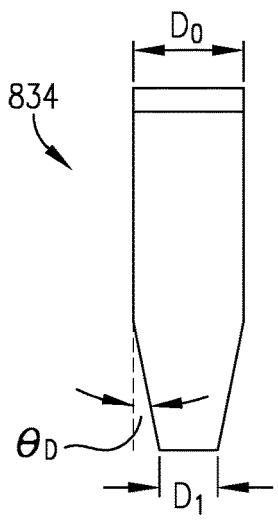
FIG. 18c is an end view of yet another embodiment of the microwave launchers generally depicted in FIGS. 16 and 17, particularly illustrating a launcher having a tapered outlet.
Figure 19:
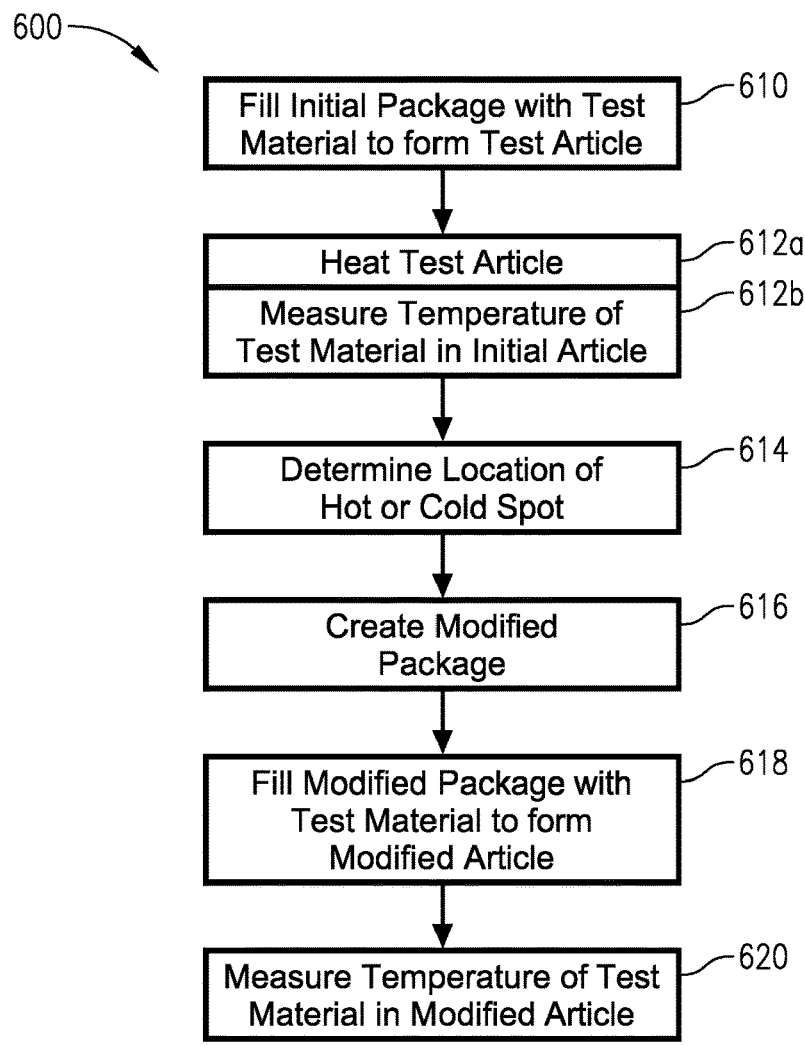
FIG. 19 is a schematic diagram of the major steps of a process for designing a package for the sterilization or pasteurization of a foodstuff according to embodiments of the present invention.

Views of one of sidewalls 832 and several examples of suitable end walls 834 are shown in FIGS. 17 and 18*a-c*, respectively. Optionally, at least one of the pair of sidewalls 832*a,b* and the pair of end walls 834*a,b* can be flared such that the inlet dimension (width $W_0$ or depth $D_0$) is smaller than the outlet dimension (width $W_1$ or depth $D_1$), as respectively illustrated in FIGS. 17 and 18*a*. If flared, the side and/or end walls define respective width and depth flare angles, $\theta_w$ and $\theta_d$, as shown in FIGS. 17 and 18*a*. The width and/or depth flare angles $\theta_w$ and/or $\theta_d$ can be at least about 2°, at least about 5°, at least about 10°, or at least about 15° and/or not more than about 45°, not more than about 30°, or not more than about 15°. When present, the values for the width and depth flare angles $\theta_w$ and $\theta_d$ can be the same, or each of $\theta_w$ and $\theta_d$ may have a different value. In some cases, the end walls 838*a,b* of the microwave launcher 822 may have a depth flare angle $\theta_d$ that is smaller than the width flare angle $\theta_w$. For example, the depth flare angle $\theta_d$ can be not more than about 0°, such that the inlet depth $D_0$ and the outlet dimension $D_1$ of microwave launcher 822 are substantially the same, as shown in FIG. 18b, or the depth flare angle $\theta_d$ may be less than 0°, such that $D_1$ is smaller than $D_0$, as shown in FIG. 18c. Other examples of suitable microwave launchers are described in detail in the '516 Application.

In some embodiments, the launch opening or openings defined by one or more microwave launchers used in the present invention may be at least partially covered by a substantially microwave-transparent window for fluidly isolating the microwave heating chamber from the microwave launcher. The microwave transparent windows, when present, may prevent fluid flow between microwave chamber and the microwave launchers, while still permitting a substantial portion of the microwave energy from the launchers to pass therethrough and into the microwave chamber. The windows may be formed of any suitable material, including, but not limited to, one or more thermoplastic or glass material such as glass-filled Teflon, polytetrafluoroethylene (PTFE), poly(methyl methacrylate (PMMA), polyetherimide (PEI), aluminum oxide, glass, and combinations thereof. The average thickness of each window may be at least about 4 mm, at least about 6 mm, at least about 8 mm, or at least about 10 mm and/or not more than about 20 mm, not more than about 16 mm, or not more than about 12 mm. Each window may be able to withstand a pressure difference of at least about 40 psig, at least about 50 psig, at least about 75 psi and/or not more than about 200 psig, not more than about 150 psig, or not more than about 120 psi without breaking, cracking, or otherwise failing.

Turning back to FIG. 15, as the carrier 310 passes through the microwave heating zone 330, the articles may be heated so that the coldest portion of the articles achieves a target temperature. When the microwave heating system is a sterilization or pasteurization system, the target temperature achieved by the articles can be a sterilization or pasteurization target temperature of at least about 65° C., at least about 70° C., at least about 75° C., at least about 80° C., at least about 85° C., at least about 90° C., at least about 95° C., at least about 100° C., at least about 105° C., at least about 110° C., at least about 115° C., at least about 120° C., at least about 121° C., at least about 122° C. and/or not more than about 130° C., not more than about 128° C., or not more than about 126° C. Unless otherwise indicated, the temperature of an article refers to the temperature measured at the coldest portion of that article.

The microwave heating chamber 330 may be at least partially liquid filled and at least a portion, or all, of the articles in the carrier may be submerged in the liquid medium during heating. The average bulk temperature of the liquid in the microwave heating chamber 330 may vary and, in some cases, can depend on the amount of microwave energy discharged into the microwave heating chamber. The average bulk temperature of the liquid in the microwave heating chamber 330 can be at least about 70° C., at least about 75° C., at least about 80° C., at least about 85° C., at least about 90° C., at least about 95° C., at least about 100° C., at least about 105° C., at least about 110° C., at least about 115° C., or at least about 120° C. and/or not more than about 135° C., not more than about 132° C., not more than about 130° C., not more than about 127° C., or not more than about 125° C.

As the carrier 310 passes through the microwave heating chamber 330, the articles may be heated to the target temperature in a relatively short period of time, which can help minimize any damage or degradation of the articles. For example, the average residence time of each article passing through the microwave heating zone 316 can be at least about 5 seconds, at least about 20 seconds, at least about 60 seconds and/or not more than about 10 minutes, not more than about 8 minutes, not more than about 5 minutes, not more than about 3 minutes, not more than about 2 minutes, or not more than about 1 minute. The minimum temperature of the articles heated in the microwave heating zone 316 can increase by at least about 5° C., at least about 10° C., at least about 15° C., at least about 20° C., at least about 30° C., at least about 40° C., at least about 50° C., at least about 75° C. and/or not more than about 150° C., not more than about 125° C., or not more than about 100° C.

In some embodiments, the microwave heating chamber 330 can be operated at approximately ambient pressure. Alternatively, it may be a pressurized microwave chamber 330 that operates at a pressure that is at least 5 psig, at least about 10 psig, at least about 15 psig, or at least about 17 psig and/or not more than about 80 psig, not more than about 60 psig, not more than about 50 psig, or not more than about 40 psig above ambient pressure. As used herein, the term "ambient" pressure refers to the pressure exerted by the fluid in the microwave heating chamber without the influence of external pressurization devices.

Referring again to FIGS. 14a and 14b, upon exiting the microwave heating zone 116, the loaded carrier may be passed to an optional holding zone 120, wherein the temperature of the articles can be maintained at or above a certain target temperature for a predetermined period of time. For example, in the holding zone 120, the temperature of the coldest part of the article can be held at a temperature at or above a predetermined minimum temperature of at least about 70° C., at least about 75° C., at least about 80° C., at least about 85° C., at least about 90° C., at least about 95° C., at least about 100° C., at least about 105° C., at least about 110° C., at least about 115° C., or at least about 120° C., at least about 121° C., at least about 122° C. and/or not more than about 130° C., not more than about 128° C., or not more than about 126° C., for a period of time (or "hold period") of at least about 1 minute, at least about 2 minutes, or at least about 4 minutes and/or not more than about 20 minutes, not more than about 16 minutes, or not more than about 10 minutes.

Thereafter, the heated articles, which may be sufficient pasteurized or sterilized, exit the holding zone 120, may be introduced into a quench zone 122, wherein the articles are cooled as rapidly as possible via submersion in a cooled fluid. The quench zone 122 may reduce the external surface temperature of the articles by at least about 30° C., at least about 40° C., at least about 50° C. and/or not more than about 100° C., not more than about 75° C., or not more than about 50° C. in a time period of at least about 1 minute, at least about 2 minutes, at least about 3 minutes and/or not more than about 10 minutes, not more than about 8 minutes, or not more than about 6 minutes. Any suitable fluid may be used in the quench zone 122 and, in some cases, the fluid may include a liquid similar to, or different than, the liquid used in the microwave heating zone 116 and/or the holding zone 120. When removed from the quench zone 122, the cooled articles can have a temperature of at least about 20° C., at least about 25° C., at least about 30° C. and/or not more than about 70° C., not more than about 60° C., or not more than about 50° C. Once removed from quench zone 122, the cooled, treated articles can then be removed from microwave heating zone 100 for subsequent storage or use.

Microwave heating systems of the present invention can be commercial-scale heating systems capable of processing a large volume of articles in a relatively short time. In contrast to conventional retorts and other small-scale systems that utilize microwave energy to heat a plurality of articles, microwave heating systems as described herein can be configured to achieve an overall production rate of at least about 5 packages per minute, at least about 10 packages per minute, at least about 15 packages per minute per convey line, at least about 20 packages per minute per convey line, at least about 25 packages per minute per convey line, or at least about 30 packages per minute per convey line, measured as described in the '516 Application.

Articles processed in a microwave pasteurization or sterilization system as described above may subsequently be obtained by a consumer, who may reheat the articles prior to consumption. As discussed above, the reheating step may include heating one or more articles in a smaller-scale consumer-type microwave oven. Depending on the size of the oven, the total number of articles heated at once can be not more than 5, not more than 4, not more than 3, or 2 or less. Typically, the microwave energy discharged by a consumer microwave oven is non-polarized or randomly polarized and has a frequency of about 2450 MHz. Additionally, articles re-heated in a consumer microwave oven are not secured in a carrier, as is done in a larger-scale pasteurization or sterilization system described previously.

The articles reheated in a consumer microwave oven may be heated for a period of at least about 15 seconds, at least about 20 seconds, at least about 25 seconds, at least about 30 seconds, at least about 45 seconds, at least about 1 minute, at least about 1.5 minutes, at least about 2 minutes, at least about 2.5 minutes, or at least about 3 minutes and/or not more than about 10 minutes, not more than about 8 minutes, not more than about 7 minutes, not more than about 6.5 minutes, not more than about 6 minutes, not more than about 5.5 minutes, not more than about 5 minutes, not more than about 4.5 minutes, not more than about 4 minutes, not more than about 3.5 minutes, or not more than about 3 minutes. Typically, consumer microwave ovens are operated at atmospheric pressure and do not include liquid-filled chambers.

The temperature achieved by the hottest portion of the foodstuff being reheated can be at least about 35, at least about 40, at least about 45, at least about 50, at least about 55, at least about 60, at least about 65, at least about 70, at least about 75, or at least about 80° C. and/or not more than about 100, not more than about 95, not more than about 90, not more than about 85, not more than about 80, not more than about 75, not more than about 70, not more than about 65, not more than about 60, not more than about 55, not more than about 50, not more than about 45, or not more than about 40° C. The temperature achieved by the coldest portion of the foodstuff being reheated can be at least about 22, at least about 25, at least about 27, at least about 30, at least about 32, at least about 35, at least about 37, at least about 40, at least about 42, at least about 45, at least about 47, at least about 50, at least about 52, at least about 55, at least about 57, or at least about 60° C. and/or not more than about 95, not more than about 90, not more than about 85, not more than about 80, not more than about 75, not more than about 70, not more than about 65, not more than about 60, not more than about 55, or not more than about 50° C.

According to the present invention, methods of designing a package for a particular foodstuff or other item to be heated in commercial microwave pasteurization/sterilization systems and at-home consumer microwave ovens as described herein are also provided. The major steps of one method 600 are shown in the flow chart provided in FIG. 18.

As shown in FIG. 18, the first step of method 600 for designing a package including one or more energy control elements is to fill an initial package with a test material to form a test article, as shown by block 610. The initial package may be a commercially-available package, or it may be custom-made, and it may or may not already include one or more microwave energy control elements. In some cases, the initial package used in this method may be a modified package that resulted from a previous trial.

Any suitable test material may be used and can include, for example, a sample of the exact foodstuff or other item which will ultimately be used to fill the package, or a substitute material used to simulate the foodstuff or other item. One example of a suitable substitute test material is whey gel pudding, such as that commercially available from Ameriqual Group, LLC (Evansville, Ind., USA). The initial package may be filled in any suitable manner. Generally, the initial package may be formed of conventional materials and may not include any type of energy control element, although situations where the initial package includes an energy control element are not excluded.

Once the initial package is filled, it may be heated in a microwave heating system using microwave energy, as shown by block 612a in FIG. 18. The microwave heating system may be a large- or pilot-scale liquid-filled microwave heating system that utilizes polarized microwave energy, as described above with respect to FIGS. 14a and 14b, or it may be a lab-scale system designed to simulate the behavior of a larger-scale system. Alternatively, the test article may be heated in a consumer-type microwave oven that utilizes non-polarized or randomly polarized microwave energy.

During at least a portion of the heating step, the temperature of the test material may be measured in one or more, preferably two or more, locations, as shown by block 612b in FIG. 18. Such temperature measurement may be performed using any suitable instrument and, in some cases, may be performed using temperature probes positioned within the test material and sealed into the packages. In these cases, the temperature probe or probes would be placed into the packages along with the test material during the filling step, shown as block 610 in FIG. 18. Alternatively, other types of temperature measurement devices may be used that may be positioned near or within the article after it has been filled.

After the article has been heated to a target temperature, it may be removed from the microwave heating zone and cooled. As shown by block 614 in FIG. 18, from the temperature measurements taken during the heating step, the location of at least one hot or cold spot within the package may be determined. In some cases, such a determination may be performed using temperature data obtained during the heating, as well as commercially available modeling software. In some cases, the location of the hot or cold spot may depend on the position of the article within a carrier, while, in other cases, it may not. The article may exhibit at least one hot spot, at least one cold spot, or at least one hot spot and at least one cold spot.

As shown by block 616, the method 600 of designing a modified package further includes the step of creating a modified package including at least one energy control element by taking one or more of the following actions: (i) adding a microwave inhibiting element near a hot spot; (ii) adding a microwave enhancing element near a cold spot; (iii) removing a microwave inhibiting element from near a cold spot; and (iv) removing a microwave enhancing element from a hot spot. In some cases, two or more, three or more, or even all four actions may be taken to form a modified package. As discussed previously, the microwave control element may be a selective microwave control element and may inhibit or enhance one type of microwave energy more than another.

Thereafter, as shown by block 618 in FIG. 18, the modified package may be filled with the same test material used to fill the initial package and form the test article. As shown by block 620, the resulting modified article may again be heated in the same microwave heating system as the test article, and the same system may be used to measure the temperature of the test material during the heating. In some cases, the temperature of the hot and/or cold spots previously determined may be measured and, after the heating step, the temperature measurements of the modified article may be compared with those taken during heating of the test article. Preferably, the temperatures of the hot and/or cold spot is lower and/or higher, respectively, so that the variation between the temperature of the hot and/or cold spot and the rest of the material is less than it was during heating of the test article. If the temperatures of the hot and/or cold spots are subsequently higher and/or lower than those measured during heating of the test article, the package may again be modified to include one or more energy control elements. Each of the steps 612 through 620 of method 600 may be repeated as many times as necessary to provide a final modified package which minimizes the presence of hot and cold spots and ensures more uniform heating of the material within the package.

DEFINITIONS

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "including," "includes," and "include" have the same open-ended meaning as "comprising," "comprises," and "comprise."

As used herein, the terms "having," "has," and "have" have the same open-ended meaning as "comprising," "comprises," and "comprise."

As used herein, the terms "containing," "contains," and "contain" have the same open-ended meaning as "comprising," "comprises," and "comprise."

As used herein, the terms "a," "an," "the," and "said" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The preferred forms of the invention described above are to be used as illustration only, and should not be used in a limiting sense to interpret the scope of the present invention. Obvious modifications to the exemplary one embodiment, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A process for heating a plurality of articles in a microwave heating system, said process comprising:
    (a) loading a group of said articles into a carrier, wherein each of said articles includes a package at least partially filled with at least one foodstuff, wherein at least a portion of said foodstuff in one or more of said packages is positioned near at least one energy control element;
    (b) passing the loaded carrier through a microwave heating chamber in a direction of travel along a first convey line;
    (c) generating microwave energy;
    (d) during at least a portion of said passing, discharging at least a portion of the microwave energy into said microwave heating chamber; and
    (e) heating said articles using at least a portion of said microwave energy discharged into said microwave heating chamber,
    wherein, during said heating, the portion of the foodstuff positioned near said energy control element is heated to a different temperature or at a different heating rate than said portion of said foodstuff would have been heated to or at if said energy control element was not present.

2. The process of claim 1, wherein the heating rate of said portion of said foodstuff positioned near said energy control element is at least 2° C./min different than the heating rate of said portion of said foodstuff would have been heated at if said energy control element was not present or wherein the temperature of said portion of said foodstuff positioned near said energy control element is at least 5° C. different than the temperature of said portion of said foodstuff would have been heated to if said energy control element was not present.

3. The process of claim 1, wherein said energy control element comprises a susceptor and said portion of said foodstuff positioned near said susceptor is heated to a higher temperature or at faster heating rate than said portion of said foodstuff would have been heated if said susceptor was not present, and wherein said heating rate of the portion of the foodstuff positioned near said susceptor is at least 10° C./min or wherein the temperature achieved by said portion of said foodstuff positioned near said susceptor is at least 100° C.

4. The process of claim 1, wherein said energy control element comprises at least one microwave inhibiting element and said portion of said foodstuff positioned near said microwave inhibiting element is heated to a lower temperature or at a slower heating rate than if said microwave inhibiting element was not present, wherein the heating rate of the portion of the foodstuff positioned near said microwave inhibiting element is not more than 20° C./min, or wherein the temperature achieved by the portion of the foodstuff positioned near said microwave inhibiting element is less than about 125° C.

5. The process of claim 1, wherein said package comprises said energy control element, wherein said energy control element comprises a plurality of energy control strips located on at least one surface of said package, wherein said energy control strips have a width in the range of from about 1/16 inch to about 1/8 inch, wherein each of said energy control strips is spaced apart from one another to thereby define an open area between adjacent ones of said energy control strips, and wherein the width of said open area is at least 25 percent higher than the average width of the adjacent energy control strips.

6. The process of claim 1, wherein said packages are at least partially filled with two or more different types of foodstuffs.

7. The process of claim 1, wherein said microwave energy directed toward said articles is polarized microwave energy and has a frequency in the range of from 850 to 1050 MHz, wherein said microwave heating chamber is at least partially filled with a liquid medium and wherein said articles are at least partially submerged in said liquid medium during said heating, and wherein said microwave heating system has an overall production rate of at least 5 packages per minute.

8. A process for heating a plurality of articles in a microwave heating system, said process comprising:
   (a) loading a carrier with a plurality of said articles, wherein each article comprises a package at least partially filled with at least one item to be heated;
   (b) passing the loaded carrier through a microwave heating chamber in a direction of travel along a convey line;
   (c) during at least a portion of said passing, directing microwave energy into said microwave heating chamber via one or more microwave launchers; and
   (d) during at least a portion of said directing, heating said articles with at least a portion of said microwave energy in order to increase the temperature of a coldest portion of each item to a target temperature,
   wherein at least a portion of said packages include at least one microwave inhibiting element for inhibiting or preventing microwave energy from reaching at least a portion of said item during said heating.

9. The process of claim 8, wherein said microwave inhibiting element is configured to reflect at least 5 percent of polarized microwave energy and is transparent to non-polarized or randomly polarized microwave energy.

10. The process of claim 8:
   wherein said package has a top surface and a bottom surface,
   wherein said microwave inhibiting element is located on at least a portion of one of said top and said bottom surfaces,
   wherein said microwave inhibiting element covers at least 5 percent and less than 95 percent of the total surface area of said package,
   wherein said microwave inhibiting element is configured to prevent microwave energy from reaching at least 10 percent and less than 90 percent of said item during said heating, and
   wherein during said heating, at least one of a temperature of the portion of said item is at least 5° C. lower than the temperature that said portion of said item would have been heated to if said microwave inhibiting element was not present and the heating rate of the portion of said item is at least 2° C./min lower than the heating rate at which said portion of said item would have been heated if said microwave inhibiting element was not present.

11. The process of claim 8, wherein a first of said articles in said carrier includes a package having a first type of microwave inhibiting element and a second of said articles in said carrier includes a package having a second type of microwave inhibiting element.

12. The process of claim 11, wherein at least of said articles includes a package having said first and said second types of microwave inhibiting element.

13. The process of claim 8, wherein at least one of said articles in said carrier does not include a package having a microwave inhibiting element.

14. The process of claim 8, wherein said item comprises a foodstuff, and further comprising, subsequent to step (d), reheating at least one of said articles in a microwave oven using microwave energy, wherein the article is not secured in a carrier during said reheating, wherein said microwave energy used during said heating of step (d) is polarized, wherein said microwave energy used during said reheating is non-polarized or randomly polarized, and wherein at least one of the following conditions (i) through (iii) is met
   (i) said microwave inhibiting element is transparent to polarized microwave energy and absorbs or reflects non-polarized or randomly polarized microwave energy;
   (ii) said microwave inhibiting element is transparent to non-polarized or randomly polarized microwave energy and absorbs or reflects polarized microwave energy; and
   (iii) said microwave inhibiting element is configured to absorb or reflect both polarized and non-polarized or randomly polarized microwave energy to pass therethrough.

15. The process of claim 8, wherein said microwave energy directed toward said articles is polarized microwave energy and has a frequency in the range of from 850 to 1050 MHz, wherein said microwave heating chamber is at least partially filled with a liquid medium and said articles are at least partially submerged in said liquid medium during said heating, and wherein said microwave heating system has an overall production rate of at least 5 packages per minute.

16. A process for heating a packaged foodstuff using microwave energy, said process comprising:
   (a) at least partially filling a package with at least one foodstuff to form a packaged foodstuff, wherein said package includes at least one energy control element;
   (b) heating said packaged foodstuff using a first type of microwave energy to thereby sterilize or pasteurize said foodstuff, wherein said heating is performed in a commercial-scale microwave heating system and includes passing a carrier loaded with said packaged foodstuff along a convey line; and
   (c) reheating said article with a second type of microwave energy to thereby provide a ready-to-eat foodstuff,
   wherein said first and second types of microwave energy have at least one of (i) different polarizations, (ii) different frequencies, and (iii) different intensities and wherein said energy control element is substantially more effective at inhibiting or enhancing one of the first and second types of microwave energy than the other.

17. The process of claim 16, wherein said first type of microwave energy is polarized microwave energy and said second type of microwave energy is non-polarized or randomly polarized microwave energy, and wherein said first type of microwave energy has a frequency of not more than 1200 MHz and said second type of microwave energy has a frequency of at least 2200 MHz.

18. The process of claim 16, wherein said heating is carried out in a liquid-filled microwave heating chamber and wherein said reheating is carried out in a microwave oven, and wherein said energy control element is a microwave inhibiting element.

* * * * *